United States Patent

[11] 3,609,320

| [72] | Inventor | Robert W. Tripp<br>Tuckahoe, N.Y. |
|---|---|---|
| [21] | Appl. No. | 809,533 |
| [22] | Filed | Mar. 24, 1969 |
| [45] | Patented | Sept. 28, 1971 |
| [73] | Assignee | Inductosyn Corporation<br>Carson City, Nev. |

[54] POSITION-MEASURING SYSTEM
30 Claims, 13 Drawing Figs.

[52] U.S. Cl. .................................................. 235/151.11,
235/92 MP, 318/603, 340/347
[51] Int. Cl. ...................................................... G05b 19/32,
H03k 13/02
[50] Field of Search .......................................... 235/92;
318/20.320, 20.720, 20.120; 235/151.11

[56] References Cited
UNITED STATES PATENTS
3,189,805  6/1965  Porpsel et al. .................  318/162

| 3,209,222 | 9/1965 | Holy | 318/28 |
|---|---|---|---|
| 3,327,101 | 6/1967 | Evans | 318/162 |
| 3,450,868 | 6/1969 | Elbling et al. | 318/18 |
| 3,473,098 | 10/1969 | Waller | 318/162 |
| 3,473,100 | 10/1969 | Anger | 318/28 |
| 3,537,102 | 10/1970 | Baratto | 340/347 |

Primary Examiner—Eugene G. Botz
Attorney—William E. Beatty

ABSTRACT: In a position measuring system a digital readout indicates the position of a movable machine member relative to a reference zero on a workpiece attached to the other machine member. The system uses a measuring device having a plurality of equally spaced measuring cycles. A reference position in these cycles herein is designated as sine zero, the workpiece reference position being offset by an amount Δ from one of these sine zero's. The contents of an internal counter controlled by the measuring device represent the position of the movable member between two adjacent sine zero's. An external counter and display indicate the actual position of the movable member with respect to the part zero.

POSITION-MEASURING SYSTEM

BACKGROUND OF THE INVENTION

1. Field of the Invention

The invention relates to a position-measuring system and, more particularly, to such a system for digitally determining and storing the difference between a workpiece zero position on a machine and the zero position of a position-measuring device, including improved means for controlling the rate of error reduction, means for inhibiting oscillations of a displayed position, and means for synchronizing counting within the system.

2. Description of Prior Art

Position-measuring systems can be easily installed and used on all types of measuring machines and machine tools, as for instance horizontal and vertical boring mills, jig borers, milling machines, grinders and lathes. The movable member of the machine may be positioned manually or by other means such as a motor for measuring dimensions of a workpiece secured to the machine.

When a workpiece is positioned and secured to a machine, the zero position of the workpiece may not coincide with the zero position of the position-measuring device. Although the difference, or offset, may be less than tenth of an inch, for precision measurements, that distance comprises a substantial error. If the offset is used to properly reference the movable member of the machine to the zero starting position of the position measuring device, subsequent measurements will be accurate.

A position measuring device usable by certain measuring systems is described in U.S. Pat. No. 2,799,835 for Position Measuring Transformer by R. W. Tripp et al. issued July 16, 1957, and sold under the trademark Inductosyn, registered in the U.S. Patent Office.

The Inductosyn device, whether in a linear or rotary form, senses the movement of a measuring machine based on the inductive coupling between conductors of the primary and secondary windings separated by a small air space. The unique manner of operation enables a very high accuracy in the measurement and control of linear or rotary displacement. The usual coupling and counting problems associated with conventional encoders and optical scales are eliminated.

One commercially available system determines offset by measuring the distance from the position of the movable member of the Inductosyn in a cycle to the next null position. The movable member is positioned at a starting workpiece, or part, dimension, and the servo loop is opened. An external counter, previously cleared to zero, is counted to the position contained in an internal counter as the internal counter counts toward zero. When the internal counter reaches zero, the counting is inhibited and the number in the external counter indicates the position of the movable member in one cycle of the position-measuring transformer. That number is used with formulas for calculating the offset value. The operator is required to record the calculated value for future calculations as necessary to complete a machine-measuring operation.

The probability of introducing an error into the measurements is increased by the use of manual computations. In certain cases, the operator could be required to remeasure all dimensions in order to reach the position at which the error became apparent. The problem is made more acute because such calculations are required whenever a new workpiece is positioned on a machine.

According to the present invention, the offset position is determined automatically and stored so that the operator is not required to engage in time consuming and sometimes difficult computations. By making the calculations automatically, the difficulties described above can be greatly reduced. In addition, by storing the results, human error and difficulties accompanying future calculations are reduced. An operator can easily resume operations after an interruption without being required to return to the initial position or engage in additional computations.

In the commercial system described above, if the magnitude of the error signal increases above a certain threshold level, one stage of an internal counter is bypassed and error indicating pulses are received directly by a higher stage of the counter. Each pulse received by the next stage represents a greater portion of the cycle. As a result, the error signal is reduced at a faster, although coarser rate.

It is believed more desirable as in the present invention to retain the use of the fine stage of the counter instead of bypassing that stage as is done by the referenced system. The frequency of the counting pulses is increased to force the counter to reduce the error signal at a more rapid rate.

In addition to the features indicated above, it is also desired to prevent oscillation of the least significant digit of the system display. The oscillation accompanies the servo action of the system as the error signal passes through zero when the command-positioning signal and the machine positions are equal. The system described above uses a biasing technique for eliminating the oscillation. In the present invention, the oscillation is prevented by inhibiting a counter which controls a display as described herein. Dead band is eliminated.

BRIEF DESCRIPTION OF THE INVENTION

Briefly, the invention comprises means for digitally measuring the offset, or displacement, of a workpiece from the starting position of a position-measuring device and for indicating and for storing the displacement.

The system operation is divided into a setup mode for digitally determining the displacement and a readout mode for digitally measuring and displaying the position of a movable machine member relative to a fixed machine member. During normal operations, the displacement is stored.

A position measuring device having fixed and movable members connected to fixed and movable machine members, respectively, produces an error signal as a function of the respective position of the fixed and movable machine members and with respect to the input command.

Logic detects changes in the sign of the error signal and inhibits oscillation of the least significant digit of the system readout display.

The error signals are used to determine the number of cycles of movement as well as movement within a cycle by the movable member of the position-measuring device. Means responsive to the error signal generates pulse width input signals to the position-measuring device. The width of the signals is a function of the position of the movable machine member relative to the fixed member. Means are included for reducing the error signal towards zero as the input signals approach a value equivalent to the machine position in a cycle of the position-measuring device.

In a preferred embodiment, the pulse width signals are generated as a function of the coincidence between a count representing the position of the movable machine member and a reference count and as a function of the coincidence between the nine's complement of the count-representing position and the reference count. By using nine's complement, the count and count complement can be changed synchronously for avoiding gross counting errors, which would occur if, for example, a ten's complement had been used. The one bit delay necessary to change the nine's complement to a ten's complement, after the counts have been changed in a cycle, is used in the preferred embodiment in inhibiting display oscillations.

If the magnitude of the error signal increases above a predetermined level, the counting rate of the system is increased to a relatively higher rate so that all cycles of the position-measuring device are counted. A relatively higher counting rate is also used during the setup mode to reduce setup time.

The counting rate can be increased by stepping the frequency of a counting signal from one frequency to another or by increasing the frequency as a function of the magnitude of the error signal.

Therefore, it is an object of this invention to automatically determine and to store the difference between the zero position of a workpiece connected to the machine and a zero position of a position-measuring device used by a position-measuring system.

Another object of the invention is to provide an improved system for determining zero offset and for indicating the determined zero offset.

Another object of the invention is to provide an improved position-measuring system for reading out and displaying the position of a movable machine member.

A still further object of the invention is to provide a process for setting a digital counter to the correct position of a movable member of a position-measuring device in a cycle of the device prior to normal operations.

Still another object of this invention is to provide an improved position-measuring system in which counting is synchronized to avoid counting error.

It is still another object of this invention to provide an improved position-measuring system including means for changing the frequency of digital counting pulses as a function of the magnitude of the error signal for counting all cycles of a position-measuring device.

Still another object of the invention is to provide an improved position-measuring system for inhibiting changes in a display as a function of changes in the sign of the error signal being reduced.

It is another object of this invention to provide a position-measuring system including means for generating pulse width input signals to a position-measuring device in response to a position error signal.

A still further object of the invention is to provide a position-measuring system capable of resuming operation after an interruption without the necessity for extensive setting up operations or computations.

A still further object of the invention is to provide a position-measuring system and process for quickly setting up machine operations for different workpieces without lengthy computations and the need to store computed data at remote locations. These and other objects of this invention will become more apparent from the description of the preferred embodiments taken in connection with drawings, a brief description of which follows:

DESCRIPTION OF PREFERRED EMBODIMENT

For purposes of this description, certain designations are adopted. For example, the counter controlling the display is referred to an an external counter because it can be controlled by an operator from a front panel through logic referred to as external control logic. The counter which controls the pulse width of command position signals from a function generator is referred to as an internal counter since it is not directly accessible to an operator from the front panel. Logic for control of the internal counter is described as internal control logic. Other parts of the system are designated in terms of their relationship to the external, internal and front panel portions.

Figure 1:
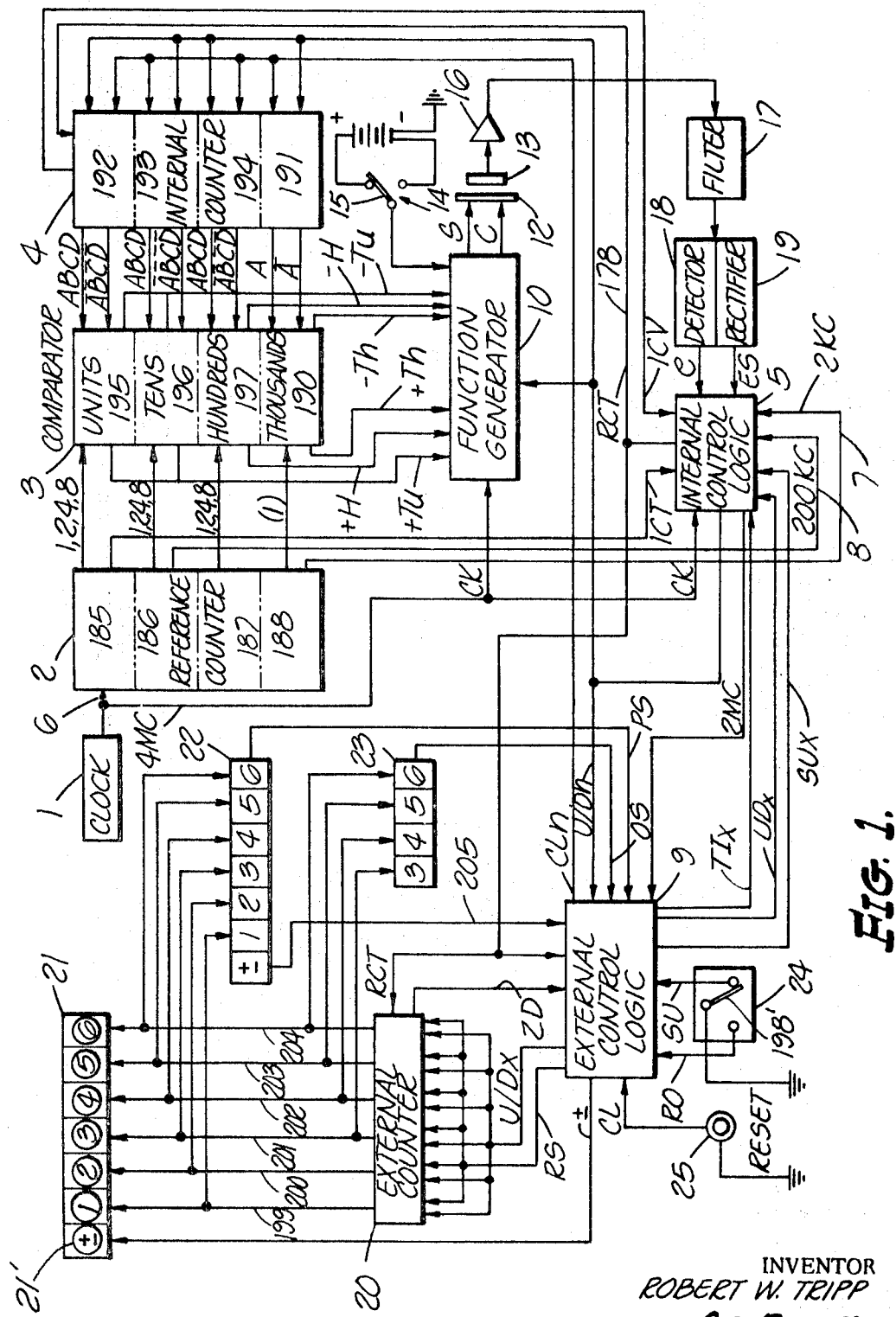
FIG. 1 represents a block diagram of one embodiment of the invention.

FIG. 1 shows a block diagram embodiment of the system for measuring and displaying the position of a movable member of the machine relative to a fixed part of the machine along one axis. Although machine members are not specifically illustrated by the drawings, the description assumes that the machine members are illustrated by the representations for the members of the position-measuring device.

The measured position may be read out and displayed as described in the description of the preferred embodiment or it may be used to punch tape, actuate a typewriter, initiate a computer process, etc. in other embodiments. Although a system is shown for measuring the position of the member along one axis, it should be understood that additional systems may be provided for each axis of the machine.

The internal portion of the system includes clock generator 1, and reference counter 2. The generator and counter are shown in detail in FIG. 2. The clock generates a signal (CK) at, for example, a frequency of 4 megacycles which is used as a counting signal by reference counter 2 and as a timing signal by other parts of the system, as described herein. The signal may be in the form of rectangular pulses which have a repetition rate equal to 4 megacycles. Although the output from the clock is described as a signal it should be understood to mean an alternating voltage level having the frequency indicated.

Reference counter 2, which includes three decade counters, 185, 186 and 187, furnishes signals proportional to the count (count signals) in each decade on 1, 2, 4 and 8 binary-coded decimal (BCD) conductors for the units (U), tens (T), and hundreds (H) counts. The thousands (Th) stage 188 which comprises a flip-flop 189 (see FIG. 2) provides a binary output (1), for example, each time 1,000 clock pulses are received at the input to counter 185. The count signals from each decade of reference counter 2 are compared in comparator 3 with corresponding count signals from each decade of internal counter 4. The signals from internal counter 4 are proportional to the count in the internal counter 4. The counting signal for controlling the count in the internal counter 4, in the form of counter toggling (RCT) pulses on line 178, is generated by internal control logic 5 as a function of a position error signal described in detail in connection with FIG. 7.

Figure 4:
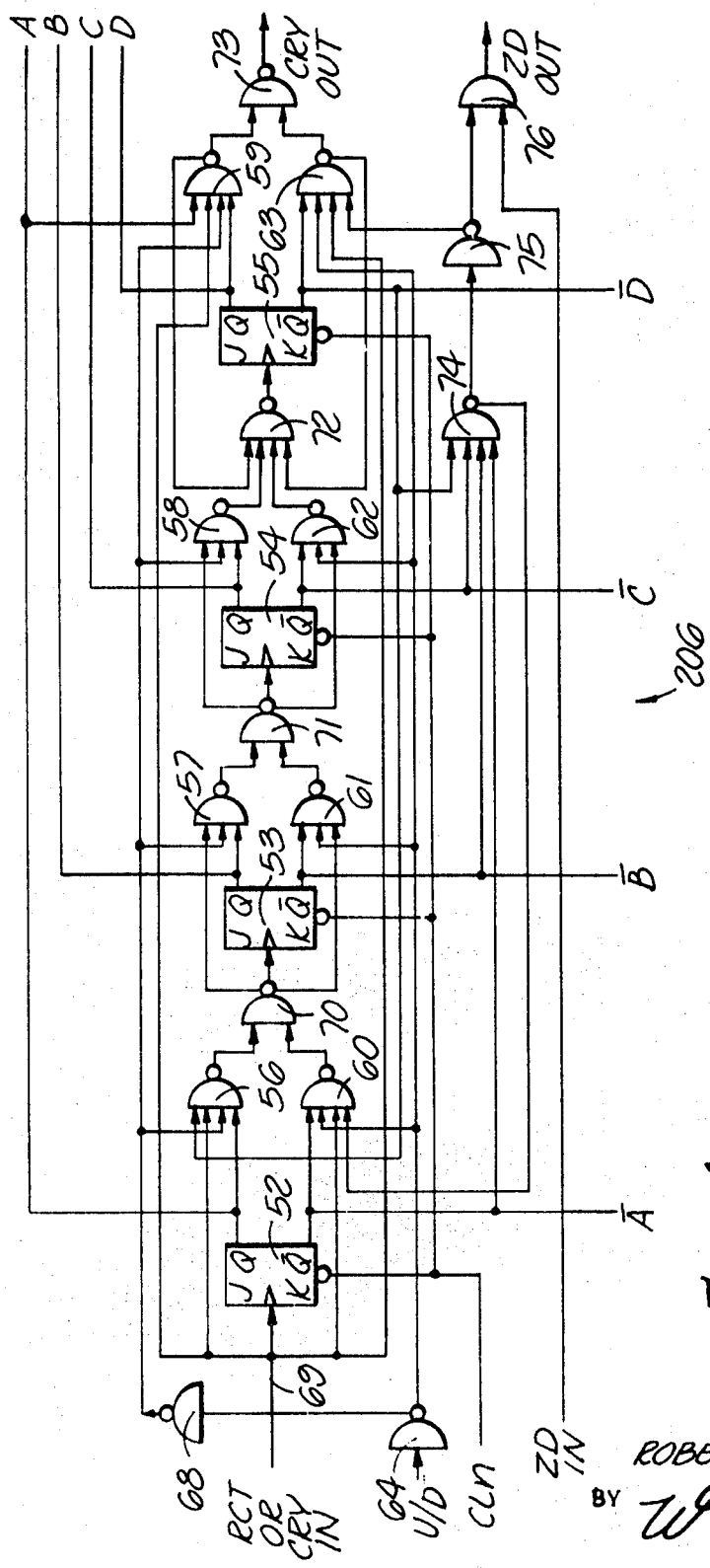
FIG. 4 represents an embodiment of one decade of a counter usable in the system.

The 4 mc. signal is received at input 6 of the reference counter 2 and is divided into signals having frequencies of, for example, 2 kc. and 200 kc. The 2 kc signal provides a basic counting rate for the system and the 200 kc. signal provides an increased counting rate for the system as subsequently described. For the embodiment described, the counting cycles of the reference counter 2 are divided into 2,000 equal parts, i.e., the reference counter 2 counts 2,000 clock pulses each counting cycle. An example of a counter which can be easily modified for use as a decade of the reference counter, by setting the logic for always counting up, is shown in FIG. 4. In other words, logic can be provided to force the decades of a counter to count up to 2,000 pulses before recycling. The counter described in connection with FIG. 4 is a reversible counter, that is, it can count up and down.

The 2 kc. and 200 kc. signals are connected to internal control logic 5 by conductors 7 and 8, respectively. The examples indicated above are used throughout the description off FIG. 1 embodiment. It should be obvious that the system is not limited to the particular examples selected.

Figure 6:
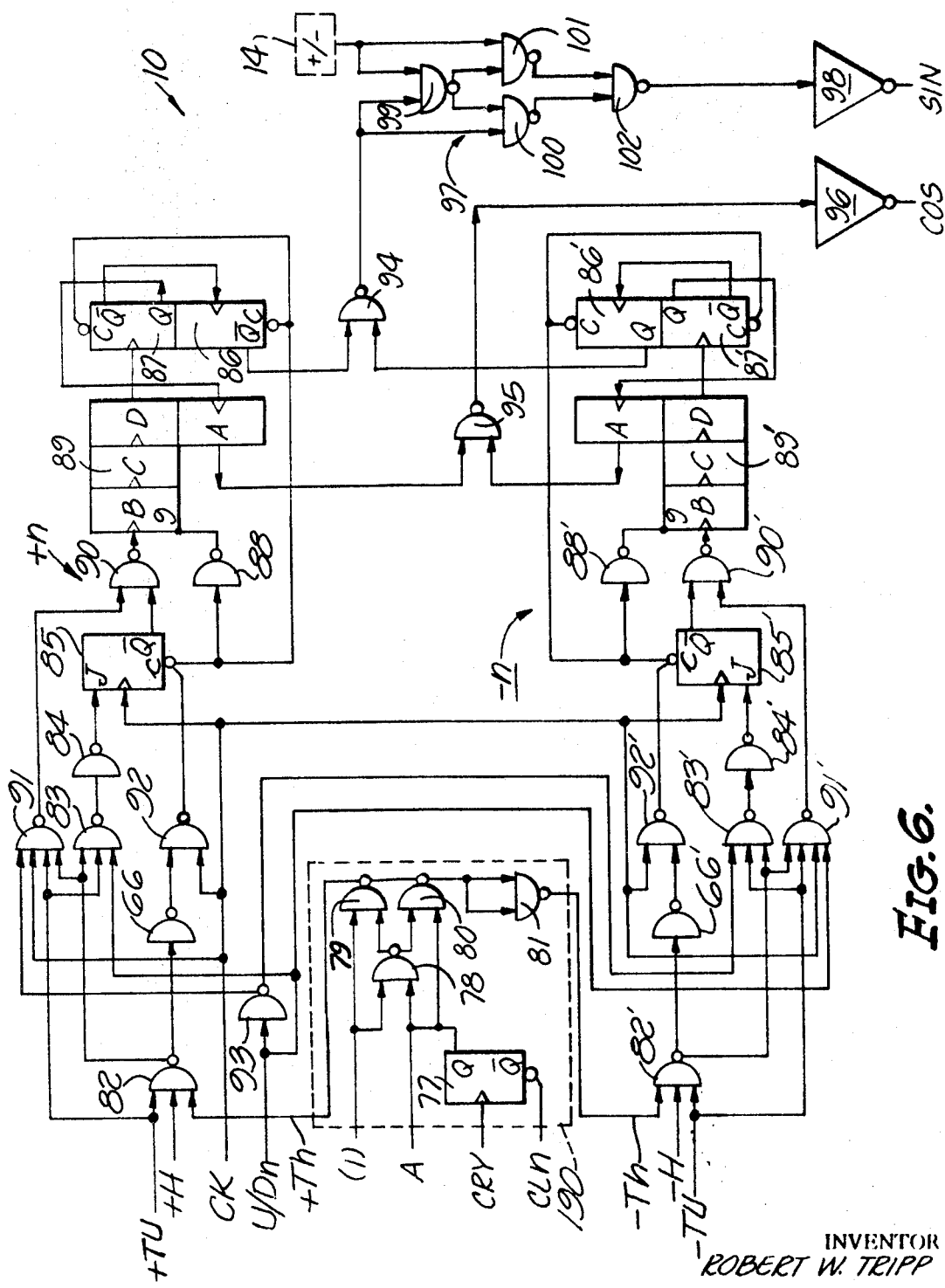
FIG. 6 represents one embodiment of a function generator usable in the system.

Although thousands comparator circuit 190 is indicated to be part of comparator 3 in a specific embodiment the thousands comparator circuit 190 may be produced as a matter of convenience with other circuits of the system. Similarly, although the thousands counting stage binary counter 191 with outputs A and $\bar{A}$ is indicated to be part of internal counter 4, it could also be produced as part of another circuit. Specifically, FIG. 6 illustrates flip-flop 77 and associated logic for generating and comparing the thousands count.

Although a combination of binary and binary-coded decimal numerical systems with corresponding circuitry is used in this description, it should be understood that other numerical systems are within the scope of the invention. For example, a straight binary numerical code and appropriate circuitry could also be used.

For the particular embodiment described herein, internal counter 4 has a counting capacity equivalent to a cycle of position-measuring device 11 so that its count represents the position of the movable machine member relative to the fixed machine member in a cycle of the measuring device. The fixed and movable machine members are represented as part of the representations for the fixed and movable members 13 and 12, respectively, of the position-measuring device 11.

Internal counter 4 includes three reversible decade counters 192, 193 and 194 for counting in binary-coded decimal and a binary counter 191 for counting straight binary. Each of the decade counters 192, 193 and 194 generate A, B, C, D and $\bar{A}$, $\bar{B}$, $\bar{C}$, $\bar{D}$ outputs representing units, tens and hundreds of RCT pulses counted by internal counter 4. The binary counter stage 191 generates A and $\bar{A}$ outputs representing thousands of RCT pulses counted by the counter.

One example of a typical decade counter which could be used as a decade of the internal counter is shown and described in connection with FIG. 4.

The internal counter 4 receives $CL_n$ signals from external control logic 9 for setting the output counts to zero and a $U/D_x$ signal from the external control logic 9 controlling the counting direction of the counter 4 during setup.

Comparator 3, which includes four comparison stages, 195, 196, 197 and 190, compares counting signals from reference counter 2 with counting signals from internal counter 4. The comparator 3 also includes logic gates for converting the internal count into a nine's complement prior to being compared with the reference count (see FIG. 3). Logic is included for inverting the 1, 2, 4, 8 inputs from the reference counter for forming $\bar{1}, \bar{2}, \bar{4}, \bar{8}$ signals for comparison with appropriate signals from the internal counter.

Figure 3:
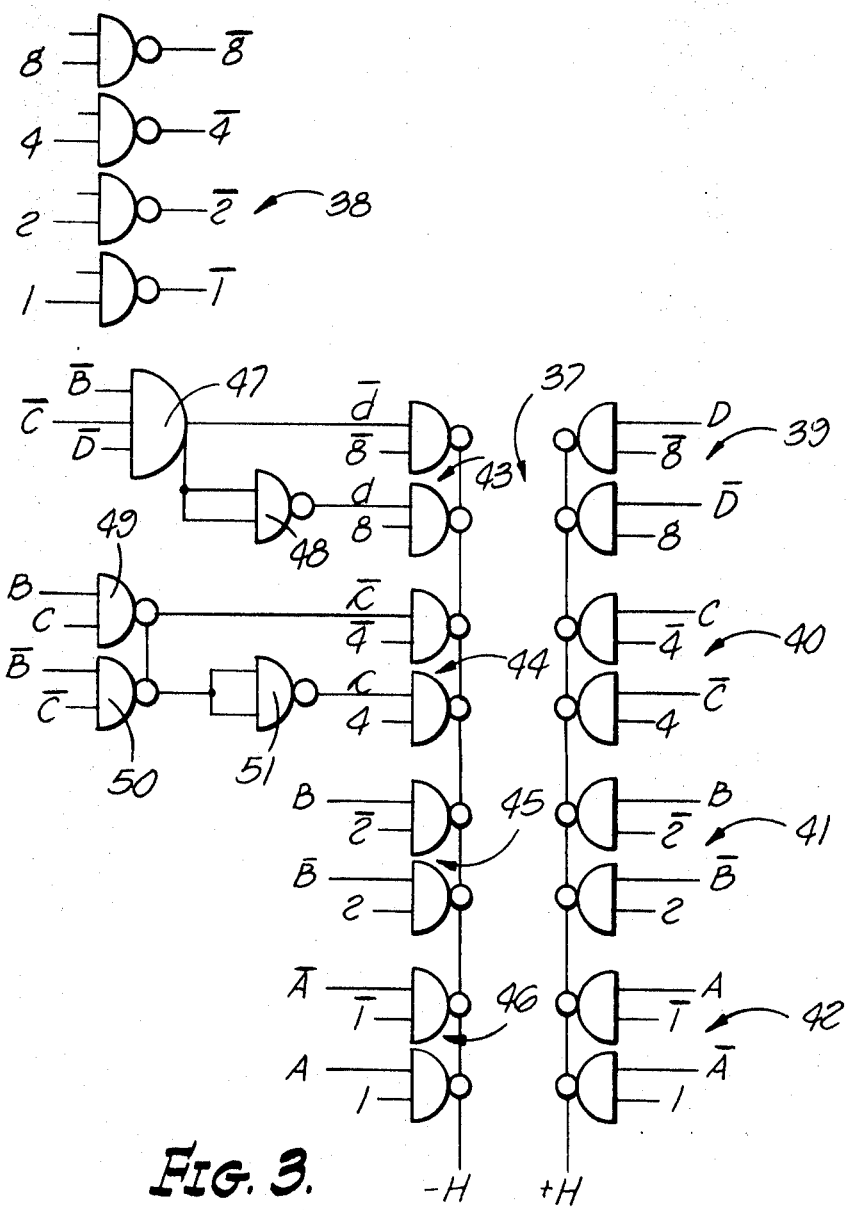
FIG. 3 represents one embodiment of comparator logic for determining coincidence between the reference counter and internal counter

An example of one comparator stage for the hundreds comparison is shown in FIG. 3. Whenever the count in the internal counter 4 coincides with the count in the reference counter 2, positive coincidence signals +TU (tens and units), +TH (thousands) and +H (hundreds) are generated as input signals to function generator 10. The TU conductors are connected together as a matter of design since the tens and units coincidence signals form common inputs to a gate in the function generator 10 as shown in FIG. 6.

Whenever the nine's complement of the count in internal counter 4 coincides with the reference count, negative coincidence signals, −TU (tens and units), −TH (thousands), and −H (hundreds) are generated as input signals to function generator 10. The −TU conductors are connected together for reasons indicated above.

Overall positive and negative coincidences are referred to herein as coincidences in the +n and −n channels, respectively. The coincidence signals are represented graphically in FIG. 5 by vectors.

Function generator 10 uses the coincidence signals in the −n and −n channels to develop pulse width signals representing trigonometric functions for the input windings of position measuring device 11 which comprises a position-measuring transformer of the type described in U.S. Pat. No. 2,799,835 previously referenced.

The pulse width of the signals from the function generator 10 is determined by the spacing of the coincidence signals, +n and −n, from a reference position. For the particular embodiment shown, the signals represent sine and cosine trigonometric functions indicated by S and C on the input conductors to position-measuring device 11.

The position measuring device 11 includes movable member 12 positionable, for example, along an X axis and fixed to a movable member of the machine. As indicated previously, the representations for movable member 12 and fixed member 13 are intended to include representations for the movable and fixed machine members, respectively. The movable member 12 may include polyphase windings such as a pair of multipolar primary windings phase shifted in space. Fixed member 13 of the device may include a continuous conductor forming a multipolar secondary winding for the device 11. The member 13 is connected to a fixed machine member such as the frame of the machine (not shown).

The movable and fixed members 12 and 13 of the position-measuring device 11 may be either linear or rotary in form depending on the particular application of the system. For some applications, involving position measuring or control, one form is preferred to the other form.

As is well known, in such a position-measuring device 11, the position of the movable member 12, with respect to the fixed member 13, can be represented by the relative displacement of the secondary winding with respect to the primary windings. The displacement is represented as an angle measured in electrical degrees. It should be understood that the spacing of three consecutive conductors of the secondary winding corresponds to a cycle of 360 electrical degrees which is equivalent, for example, to 0.2 linear inches. For the example given, the device 11 would pass through a cycle every 0.2 inches. One count of the internal counter 4 is equivalent to 0.0001 inches of movement.

Sine reverse switch 14 has a + and a − position for reversing the polarity of the sine signal into position-measuring device 11. By reversing the switch position, a positive number may be represented by either left or right machine motion relative to a reference on, for example, a workpiece (referenced in FIG. 11). The minus (+) input for reversing the polarity of the signal is connected to the function generator 10 when the arm 15 of the switch 14 is down. Arm 15 of the switch is shown connected to electrical ground for providing the relatively low, or minus, input when the switch 14 is in the down position.

Preamplifier 16 is connected between fixed member 13 of the position-measuring device and filter 17 for amplifying the error signal from the position-measuring device 11. All harmonics except the basic frequency signal being used by the system, are filtered by filter 17. Filters and preamplifiers are well known in the art and for that reason details are not included. The error signal received by the filter from the preamplifier, is changed into a sinusoidal signal having a magnitude as a function of the difference between the command position represented by sine and cosine signals from function generator 10 and the actual position of the movable member 12 in a cycle of the measuring device 11.

The output signal from the filter 17 is processed through phase detector 18 for generating a DC error signal, $e$. The error signal has a polarity as a function of the direction of positional error between the movable and fixed machine member. Phase detectors and associated circuitry for generating DC voltages are well known in the art. The error signal, $e$, is used as described in FIG. 7 in generating RCT pulses and $U/D_n$.

The output signal is also processed through full wave rectifier 19 for generating frequency control signal, Es. The signal has a DC voltage level as a function of the amplitude of the input signal and is used as described in FIG. 7 in changing the counting rate from one frequency to another as a function of its magnitude. Full-wave rectifiers and associated circuitry are also well known in the art.

Internal control logic 5 includes flip-flops and logic gates (see FIG. 7) for generating RCT counting pulses as a function of signals $e$, Es, and the clock, CK. RCT pulses are inhibited as a function of changes in the sign of the error signal, $e$, for preventing oscillation of the least significant digit of the display on display 21.

Generation of the RCT pulses is synchronized by logic gates in the internal control logic 5 as a function of coincidence between units comparison signals, 1CT and 1CV, from the units decades 185 and 192 of reference counter 2 and internal counter 4, respectively. Synchronization is necessary, as described in detail with FIG. 7, to prevent counting errors.

Additional logic gates within (see FIG. 7) internal control logic 5 generate a $U/D_n$ signal for controlling the counting direction of the internal counter 4 and external counter 20 through external control logic 9. The logic state of the $U/D_n$ signal and, therefore, the counting direction is controlled by $UD_x$ and $SU_x$ signals generated by the external control logic 9 during a setup mode and by the sign of error signal, $e$, indicating direction of positional error during a normal readout operation.

The frequency of the RCT pulses on line 178 can be changed from 2 DC to 200 kc. as a function of the mode of operation or the magnitude of the error signal as indicated by Es.

A 2 mc. counting signal is generated for use by external control logic 9 as described in connection with FIG. 8.

External control logic 9 includes a counter (counter 134, FIG. 8) counting, in this instance, at a 2 mc. rate, associated logic gates and flip-flops, for controlling the sequence of system operations during the setup and readout modes. The external control logic 9 provides $U/D_x$ signal for controlling counter direction of external counter 20 as a function of the direction of movement of the movable machine member (included within numeral designation 12) represented by the logic state of the $U/D_n$ signal. A +, − signal, on a line identified as ±, is provided to the display 21 for displaying the sign of the number contained in the external counter 20. The display 21 is slaved to the external counter 20.

A reset signal (RS) is generated by the external control logic 9 to clear the external counter 20 and a $CL_n$ signal is generated for clearing the internal counter 4.

The external control logic 9 is described in more detail in connection with FIG. 8.

Mode switch 24 includes readout (RO) and setup (SU) positions for controlling the mode of system operation. Conductors labeled RO and SU control gates (151, 152 shown in FIG. 8) in external control logic 9 depending on the position of the arm 198 of the mode switch 24 and other conditions described subsequently. The arm is connected to electrical ground for providing a relatively low input to the gates 151 and 152 as shown in FIG. 8.

Reset switch 25 is connected to the external control logic 9 for resetting external counter 20 and display 21 to zero when it is desired to establish a new reference position and at the start of the setup mode. The switch 25 may be a pushbutton mounted on the front panel (not shown) for applying an electrical potential to devices (not shown) within the decade counter 134, FIG. 8, for setting the devices to logic zero. The input to the external control logic 9 from the reset switch 25 is designated as CL.

External counter 20 comprises six reversible decade counters of the type shown and described in connection with FIG. 4. The 1, 2, 4 and 8 (binary coded decimal) output conductors from each stage are connected to the corresponding decade of display 21. One line is used for convenience to represent the output conductors 199 through 204 from the four stages of each decade. It should be understood that four conductors are connected between each decade and a display indicator (1 through 6 of display 21).

In addition, the output conductors 199 through 204 of counter 20 are connected to the respective 1, 2, 4 and 8 terminals of storage device 22 which stores the part starting number, or position. The output conductors are also connected to storage device 23 which stores the displacement, or offset, number determined during the setup mode as described in detail subsequently.

Coincidence conductors, PS and OS, for storage devices 22 and 23, respectively provide external control logic 9 with signals indicating coincidence between the count in the external counter 20 and the stored digits at appropriate times during the setup mode.

The offset storage device 23 may comprise four thumbwheel switches connected to the least significant decades (3 through 6) of the counter and the least significant digits (3 through 6) of the display 21. The part start storage device 22 may comprise six thumbwheel switches (see FIG. 9 for example) and a sign switch connected to appropriate decades of external counter 20, external control logic 9, and the display 21. The sign switch, ±, is connected to the external control logic 9 via conductor 205. Other storage devices including relays, solid-state devices, computer storage, tape, etc. may also be used within the scope of the invention.

Display 21 may comprise six decimal indicating cold cathode tubes and a sign indicating cold cathode tube including appropriate decoding and drive circuits for converting the binary-coded decimal (BCD) outputs from the external counter 20 into decimal indications for the display. Other devices such as the examples given in connection with storage devices 22 and 23 could also be used.

In the preferred embodiment, the mode switch 24 and reset switch 25, thumbwheel storage devices 22 and 23, and display 21 are mounted on the front panel (not shown). As indicated previously, the system shown in FIG. 1 would have to be duplicated for each axis of a machine except for clock 1 and reference counter 2 which may be shared with other systems.

Figure 2:
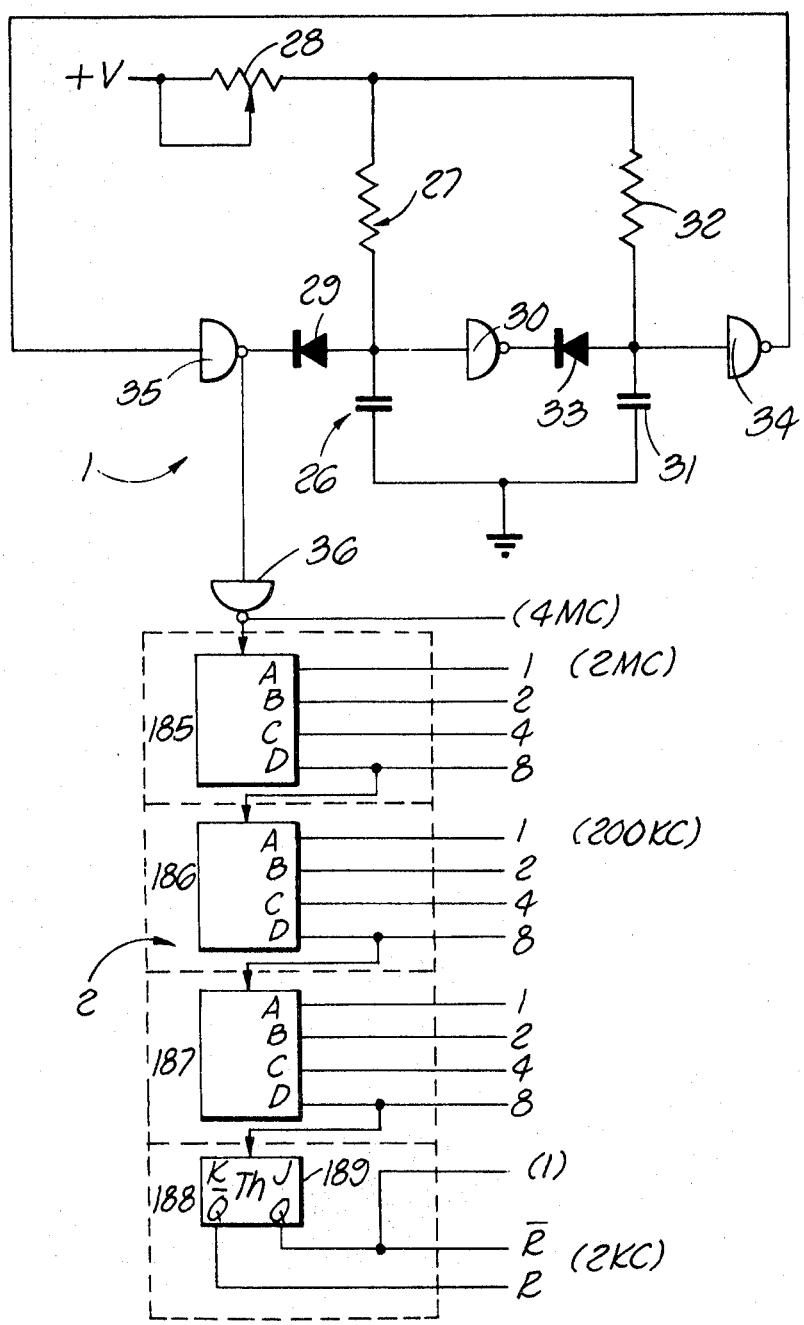
FIG. 2 represents one embodiment of a clock and reference counter usable in the system.

FIG. 2 shows one embodiment of clock 1 comprising capacitor 26 which has a charge path from electrical ground through resistor 27 and potentiometer 28 to source V. The capacitor 26 has a common connection between diode 29 and gate 30. All gates shown in FIG. 2 are Nand logic types.

Capacitor 31 has a charge path from electrical ground through resistor 32 and the potentiometer 28 to the voltage source V. The capacitor 31 is connected between diode 33 and gate 34. The output from gate 34 is the input to gate 35.

The output from gate 35 is the input to gate 36 which supplies clock pulses (4mc.) to reference counter 2. When the output of gate 36 is relatively high, as when the output of gate 35 is relatively low, diode 29 is cut off and capacitor 26 charges through its charge path. When it charges to approximately V/2, the output of gate 30 is set low and capacitor 31 discharges. The output of gate 34 is set high and the output of gate 35 is set low thereby discharging capacitor 26.

The charge and discharge sequence for the capacitors 26 and 31 is repeated for generating a clock signal having a frequency of, for example, 4 mc. Two capacitor networks are used to generate a clock signal having a maximum separation between pulses and a minimum pulse width.

Figure 10:
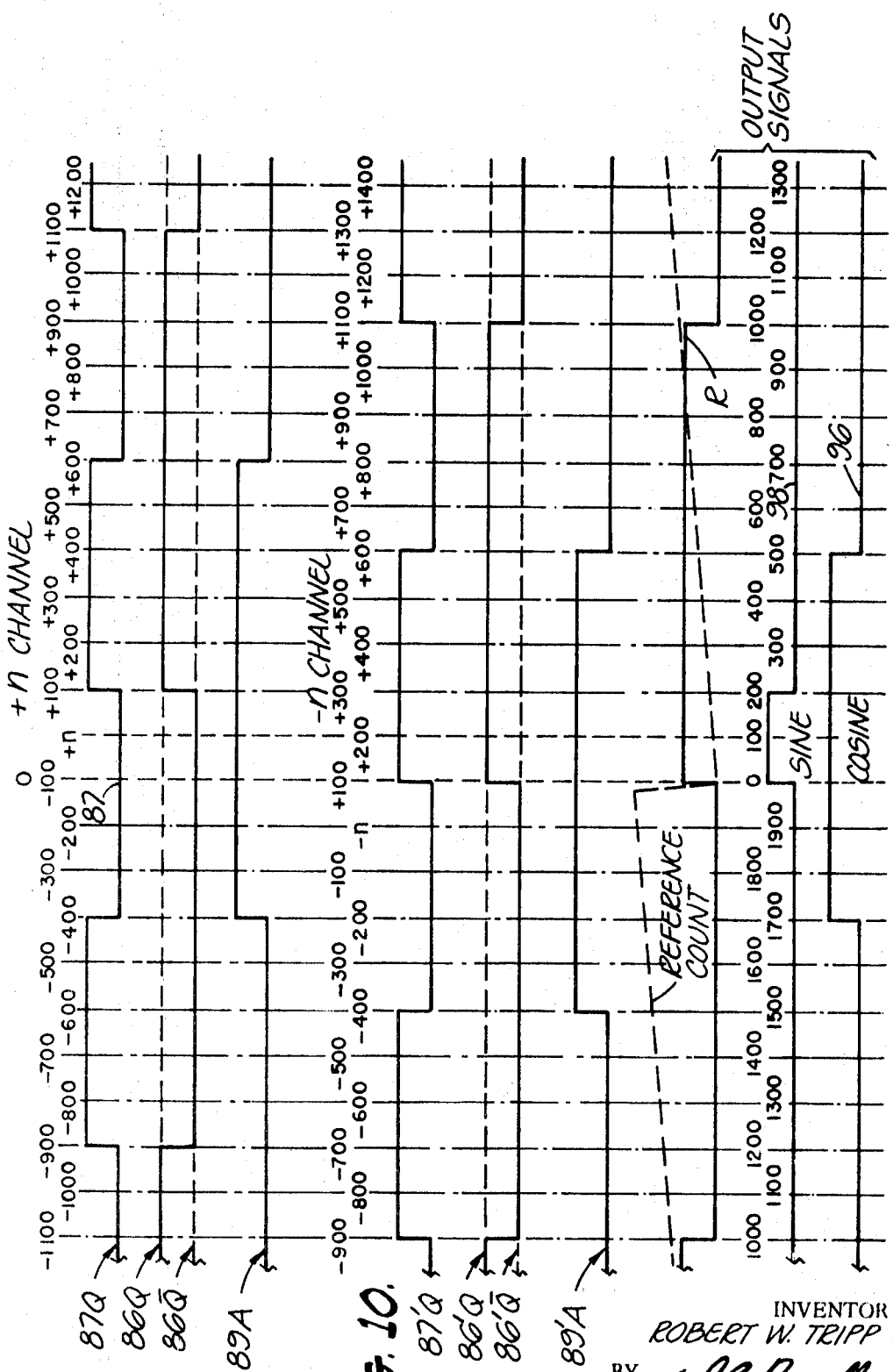
FIG. 10 illustrates the relationship between signals produced within the system.

Reference counter 2, also shown in FIG. 2, comprises three BCD decade counters 185, 186 and 187 connected in series for counting clock pulses received from gate 36 and for providing 1, 2, 4, 8 outputs from each decade-indicating units, tens and hundreds of clock pulses received. The reference counter 2 also comprises a thousands flip-flop (Th) 189 connected in series with the hundreds decade 187 for changing logical states every one thousand clock pulses. The Q or "1" output of the flip-flop is used as the one thousands comparator signal (RTh) in the function generator. The other output, R, on line 7, is used as the 2 DC basic, or reference, frequency signal. One example of the reference signal is shown in FIG. 10, labeled as R. A representation of the counting sequence is shown as the sawtooth signal in FIG. 10. A signal on line 8 representing the increased frequency rate of 200 kc. may be taken from the "A" output of the second or tens (T) decade counter 186.

Outputs from the decades 185, 186, 187 and 188 of the reference counter 2 are connected to comparator 3 as shown in FIG. 1.

FIG. 3 illustrates an embodiment of comparator circuit within comparator 3 for comparing output signals from one decade of the reference counter 2 and internal counter 4. The circuit shown includes logic gates, described specifically in the following paragraph, for comparing the hundreds count (H) in the reference counter 2 with the hundreds count and the nine's complement of the hundreds count in the internal counter 4.

BCD outputs from the hundreds decade 194 of the internal counter 4 (FIG. 1) are designated A, B, C, D, and $\overline{A}, \overline{B}, \overline{C}, \overline{D}$, whereas outputs from the corresponding decade 187 of reference counter 2 are designated by the numerals 1, 2, 4 and 8 (FIG. 1). Logic 38, comprising four Nand gates, inverts the 8, 4, 2, 1 reference counter 2 outputs so that the $\overline{1}, \overline{2}, \overline{4}$ and $\overline{8}$ states are also available for comparison. The invertor gates 38 could have been included as part of the reference counter 2, or, both logic states could have been made available from the decades forming the reference counter 2.

Nand gate combinations 39 through 42 implement exclusive Nor logic for comparing an internal count with the reference count. When there is complete coincidence between all input lines from the hundreds decades of both counters, a logic "1" level appears at the +H output.

Nand gate combinations 43 through 46 implement exclusive Nor logic for comparing the nine's complement of the internal count with the reference count. The nine's complement of the count is obtained by logically treating certain outputs from internal counter 4 as described below.

And gate 47 in combination with Nand gate 48 complements the most significant bit, D, of the internal counter 4. Nand gates 49 and 50 in combination with Nand gate 51 complement the next significant bit, C, of the internal counter 4. The B bit does not change in its complemented state and the A bit is complemented by reversing the inputs to the Nand gate combination 46. Therefore, instead of comparing A with 1 as in gate combination 42, $\overline{A}$ is compared with $\overline{1}$ as in Nand gate combination 46.

Where there is coincidence between the reference count and the nine's complement of the H count, a logic "1"level appears at the +H channel output. Both the +H and —H outputs are connected to the function generator 10.

Although only one comparator circuit is shown, it should be obvious that additional circuits are required for each decade (tens, units) of the reference counter 2 and internal counter 4.

The comparator circuit 190 for the one thousands count is contained in the function generator 10, although it could also be contained in the comparator 3 with the other comparator circuits as described in connection with FIG. 1.

FIG. 4 illustrates one embodiment of a reversible BCD counter 206 which can be used as a decade of the counters described in connection with FIG. 1.

Fro example, six such counters would be used in implementing external counter 20 and three counters, each having outputs A, B, C, D and $\overline{A}, \overline{B}, \overline{C}, \overline{D}$ (as shown) could be used with one flip-flop such as flip-flop 189 of FIG. 2, for implementing internal counter 4. The Q and $\overline{Q}$ outputs from JK flip-flops 52 through 55 represent BCD bits 1, $\overline{1}$, 2, $\overline{2}$, 4, $\overline{4}$, 8, $\overline{8}$, respectively.

Nand gates 56 through 59 control the flip-flops 52 through 55 when the decade is counting up and Nand gates 60 through 63 control the flip-flops 52 through 55 when the decade counter 206 is counting down. The U/D inputs to Nand gate 64 determine whether or not the decade counter 206 is set to count up. In that case, the low output from gate 64 is inverted by Nand gate 68 to set the decade to count up. In the event the input to gate 64 is low, the output is high and the decade counter 206 is set to countdown.

Each of the flip-flops 52 through 55 can be cleared to zero by an RS signal generated by reset switch 25 if the decade counter 206 is part of external counter 20 or by a clear signal, $CL_n$, if the decade counter 206 is part of internal counter 4.

Input pulses to the decade counter 206 are received on conductor 69 designated as RCT or CRY IN. The decade could be the first stage of either external counter 20 or internal counter 4 and therefore be receiving RCT pulses or it could be a subsequent stage of one of the counters 20 or 4, and therefore be receiving carry (CRY) pulses.

Nand gates 70, 71, 72 and 73 provide the proper output voltage levels to switch, or toggle, the flip-flops 52-55 of the decade counter 206 from one state to another. Nand gate 73 provides a carry (CRY OUT) to the next decade (not shown).

For the particular embodiment shown, And gate 76 has been added to determine when the decade counter 206 has a zero count. The zero detect capability is used by external control logic 9 to determine the setting of the $U/D_x$ signal as described in FIG. 8. Additional details are described and shown in connection with FIG. 8 for the external control logic 9.

Assuming the decade counter 206 has been cleared and U/D is high, a pulse received at the input of flip-flop 52 sets the Q output high. No other flip-flop would be set since Nand gates 56 through 59 would be inhibited by the zero setting of the flip-flops 52–55 prior to receipt of the first pulse, now U.S. Pat. No. 3,514,775.

Upon receipt of the next input pulse, the Q output from flip-flop 52 changes states from high to low. The output from gate 56 is high, thereby setting the output from gate 70 low upon receipt of the next clock pulse (RCT or CRY IN) for setting the Q output from flip-flop 53 high.

The counting sequence is continued until the decade counter 206 contains a count of 9, at which time the output from Nand gate 59 is set low. The next count pulse then sets the Q output of flip-flop 55 low and produces a carry output from Nand gate 73 into the next decade (not shown).

When all the Q outputs are high, thereby indicating a zero condition (ZD), Nand gate 74 is set low and Nand gate 75 is set high. When a zero condition is detected for a preceding decade (not shown) as indicated by a high signal on the ZD-IN conductor, the output ZD-OUT of And gate 76 to a succeeding stage is high.

Figure 5:
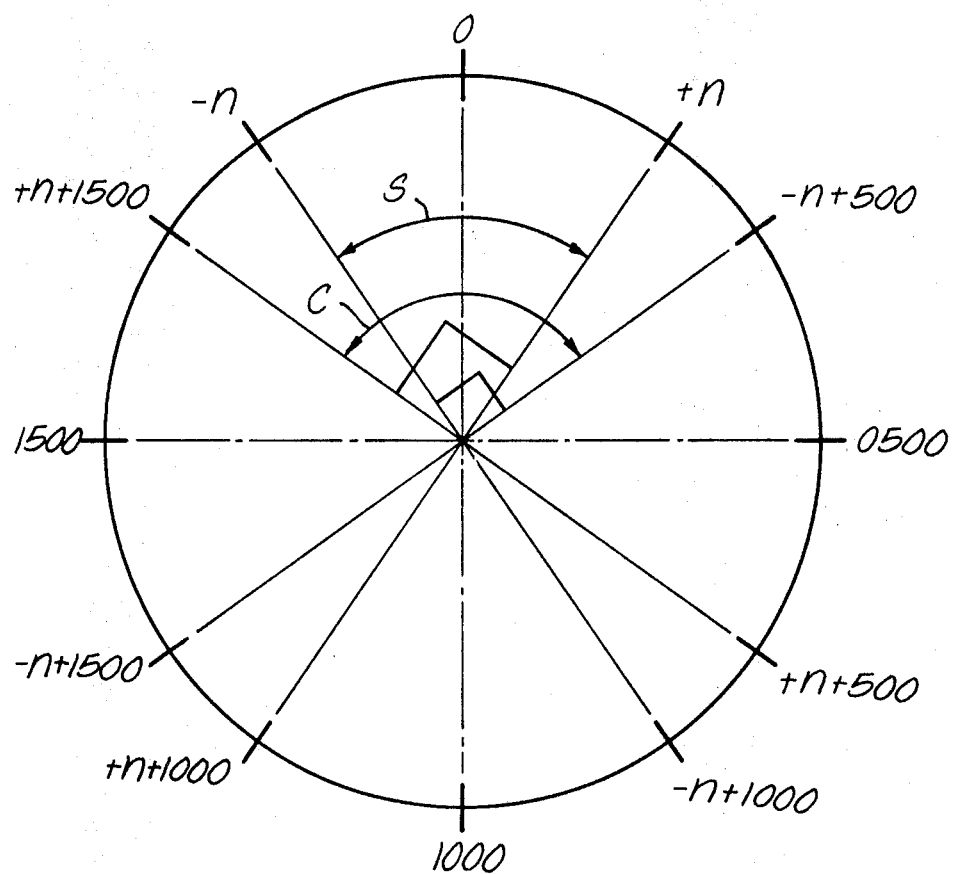
FIG. 5 is a vectorial illustration of the relationships between pulses used in generating signals representing trigonometric functions.

FIG. 5 is a vectorial representation of coincidence signals, or pulses, +n and —n generated by the comparator circuits of the system (see FIG. 1 and 3).

The circle (360°) represents a cycle of the reference counter 2 beginning at reference position "0."For the assumed example, the circle is divided into 2,000 equal intervals so that each interval, or count, is equivalent to an angle measured from the reference position. For example, a count of 1 in the internal counter 4 would be equivalent to an angle of 0.18°, and as the count increases, the angle represented by the count increases.

The pulses represented by the vectors are equally spaced on both sides of the reference to eliminate errors caused by undesirable phase shifts in the system. Phase shifts in the system cause both pulses to be shifted in the same direction relative to the reference. As a result, the pulse separation and, therefore, the command position remains the same. Additional methods for producing sine/cosine analog waveforms usable by the system as alternatives to the method described and shown, can be seen by referring to U.S. application Ser. No. 645,161, filed June 12, 1967, for a Digital-to-Analog Converter by Robert W. Tripp.

Other signals, or pulses, represented by vectors —n +500, +n+500, —n+1,000, +n+1,000, —n+1,500, +n+1,500, are also generated by the function generator 10. By properly selecting pulses, pulse width analog signals can be generated which represent trigonometric functions in various quadrants of the circle.

Although not shown in FIG. 5, but as will be described in connection with FIG. 6 and as shown in FIG. 10, each pulse width signal is displaced from the reference position by an additional interval of 100.

FIG. 6 illustrates one embodiment of function generator 10 for generating pulse width analog signals representing sine and cosine trigonometric functions as a function of count coincidence between reference counter 2 and internal counter 4. The pulse width signals may be described as position command signals to position measuring device 11.

The circuit includes thousands counting flip-flop 77 which is driven by the carry information (CRY) from the hundreds decade of the internal counter 4. The flip-flop 77 also receives a clear ($CL_n$) input from the external control logic 9 during the setup mode.

The Q output (A) connected to Nand gate 78, represents an internal count of one thousand each time it goes high. The $\overline{Q}$ output is not used in the embodiment shown. The $\overline{Q}$ output would represent the $\overline{A}$ output shown in FIG. 1 if used.

The exclusive nor/or circuit comprised of Nand gates 78 through 81, provides a low output from gate 81 if the thousands reference count RTH(1), and the output from flip-flop 77 (A) agree. If the input counts disagree, the output from gate 81 is high. The output upon disagreement represents the complemented thousands coincidence, $-$Th, in the $-n$ channel. The input to gate 81, which is high upon agreement of the input counts, represents the uncomplemented thousands coincidence, $+$Th, in the $+n$ channel.

Since the $+n$ and the $-n$ circuitry is in part identical only the $+n$ channel is described in detail. Primes of the numerical designations used in describing the $+n$ channel are used in designating identical circuitry in the $-n$ channel.

The $+n$ channel comprises Nand gate 82 having coincidence inputs $+$TU, $+$H and $+$Th from comparator circuits of the type described in FIG. 3 and as described above in connection with flip-flop 77. The output from gate 82 comprises an input to Nand gate 83 which also has inputs from the $+$TU and $U/D_n$ lines. The output from Nand gate 83 comprises an input to and is inverted by Nand gate 84.

The output from Nand gate 82 is also directed through Nand gates 66 and 92 to provide a signal for clearing JK flip-flops 85, 86 and 87. In addition, the output from gate 92 is inverted by Nand gate 88 which has its output connected to counter 89 to preset the counter to state nine (A B C D =1,001). The B stage of counter 89 is also driven by the output from Nand gate 90 which has inputs from Nand gates 91 and the Q output of flip-flop 85. Counter 89 is a decade counter used in a biquinary mode, i.e., a scale of five followed by a scale of two.

Counting is initiated in counter 89 when there is overall coincidence in the $+n$ channel followed by counting signals through Nand gate 83 or 91 depending upon the high or low status, respectively, of line $U/D_n$ when coincidence is detected between the tens and units counts of the internal counter 4 and the tens and units counts of the reference counter 2.

Each TU coincidence causes the biquinary counter 89 to increase by a count of one. If the counting rate is increasing, the TU coincidence occurs at a faster rate and the rate of the sine/cosine pulse width signals is increased. When the machine movable member (included as part 12, FIG. 1) is at rest, TU coincidence occurs every 100 clock pulses. As a result, since a cycle is 2,000 clock pulses, counter 89 counts 20 times during one counting cycle of reference counter 2. However, when the machine member is moving, the internal counter 4 is changing counts so that each TU coincidence occurs at a different count depending on whether the internal counter 4 is counting up or down. For example, if the system is operating at a counting rate of 200 kc, and the counter is counting up, TU coincidence would occur each 105 clock pulses instead of each 100.

In toggling, or causing a change in the count of, counter 89, Nand gate 90 receives one input from Nand gate 91 which itself receives inputs from the $+$TU line, from the clock (CK) line, and from the $U/D_n$ line inverted by Nand gate 93. Nand gate 90 also receives an input from the $\overline{Q}$ of flip-flop 85.

Flip-flop 86 is driven by the $\overline{Q}$ output of flip-flop 87. The $\overline{Q}$ output of flip-flop 86 drives Nand gate 94.

Flip-flop 87 is driven by the D stage of counter 89. The Q output of flip-flop 87 drives the A stage of counter 89 which provides an output to Nand gate 95.

As previously indicated, the $+n$ channel comprises similar circuitry for providing inputs to gates 94 and 95.

The output from Nand gate 95 drives inverting amplifier 96 for producing a rectangular signal having a width proportional to the angle represented by the count in the internal counter 4. Gate 95 remains on for a period proportional to the count and for the interval between coincidence pulses as described in connection with the vector diagram (FIG. 5).

Nand gate 94 similarly remains on to produce a rectangular signal proportional to the angle represented by the count in the internal counter 4. The output from Nand gate 94 passes through the sine reversing logic 97 to inverting amplifier 98.

Sine reversing logic 97 comprises Nand gate 99, 100, 101, and 102 for inverting the sign of the rectangular signal from Nand gate 94. When switch 14 (see FIG. 1) is at relatively high potential, such a voltage is applied to the inputs of gates 99 and 101 for inverting the signal. As a result, the relative positive and negative directions of machine movement can be reversed. For example, if the arm 15 of the switch 14 is up, positive motion of the machine could be in a first direction, whereas if the arm 15 of the switch 14 is down the positive motion would be in the opposite direction.

In operation, when Nand gate 82' of the $-n$ channel detects coincidence between the reference count and the complement of the internal count, its output goes low. For the example, it is assumed that the internal counter 4 is counting down and the $U/D_n$ line is low.

When the output of gate 82' is low, after flip-flops 85', 86' and 87' had been cleared to a zero state, Nand gate 88' is high and counter 89' is set to a count of nine or one below its capacity, the D and A stages are set to logic one states, the B and C stages are logic zero.

During coincidence, the output of gate 83' is high and the output of gate 84' is low. Therefore, flip-flip 85' remains unchanged.

At the next TU coincidence, approximately 100 clock pulses, or counts, following $-n$ coincidence, Nand gate 84' is set high so that upon receipt of the next clock pulse (CK), gate 91' is set low and gate 90' is set high to add a count of one to the count of nine in the counter. As a result, the B, C and D stages are set to logical zeros. The output from gate 82' is high since there is a lack of coincidence on the $-$Th and the $-$H lines. Since flip-flop 85' was interposed between gates 84' and 90', a one bit delay is incurred. The one bit delay converts the nine's complemented number, $-n$, into a ten's complement and is used as described subsequently in inhibiting display oscillations.

When the D stage toggles, flip-flop 87' is set high and flip-flop 86' is set high.

Five hundred counts following $-$TU coincidence, the D stage again changes from a logical one to a logical zero and flip-flop 87' is set low. As a result, the A stage of counter 89' is set low. Therefore, one input to Nand gate 95 is low and the output from inverting amplifier 96 is low. Previously, the inverting amplifier 96 was set high when the A stage of the counter 89 was set high. When both A stages were high, both inputs to gate 95 were high and the output from inverting amplifier 96 was high.

As shown further in FIG. 6, Nand gate 94 receives inputs from $\overline{Q}$ output of flip-flop 86 and the Q output of flip-flop 86'. The 86' Q output is set high at $-n+100$ when the 86 $\overline{Q}$ output is high. Therefore, the output from Nand gate 94 is set high. Subsequently, at $+n+100$, the 86 $\overline{Q}$ output is set low so that the output from Nand gate 94 is set low. Therefore, gate 94 is set low during the period from $-n+100$ to $+n+100$. Inverting amplifier 98 provides a high output during that period unless switch 14 is operated to reverse the polarity of the input signal to amplifier 98.

The relationship of the output signals from flip-flops 86, 86', 87, 87' and from the A stages of the counters is shown more clearly in FIG. 10. The output 86Q from flip-flop 86 and the output 86'Q from flip-flop 86' both are used in producing the sine output signal. As indicated by the signals, inverting amplifier 98 for the sine signal turns "on," or is driven high when the Q output from flip-flop 86' goes high, and turns "off," or is driven low, when the $\overline{Q}$ output from flip-flop 86 goes low, assuming that the reversing input from switch 14 is low, thereby causing the outputs of gates 94 and 102 to agree.

Cosine amplifier 96 turns on, or is driven high, when the output of the A stage of counter 89 goes high and turns off or is driven low when the output from the A stage of counter 89' goes low.

The midpoints of both signals (sine and cosine) are seen in FIG. 10 to be equally displaced by 100 clock periods from zero reference position of reference signal, R. The count (0–1999) of the reference counter 2 is represented by the dashed signal superimposed over the reference signal.

The period during which amplifier 98 is on provides a rectangular signal which can be filtered to provide a sinusoidal signal having an amplitude proportional to the sine of the angle represented by the count in the internal counter 4. The same filtering use can be applied to producing a sinusoidal signal having an amplitude proportional to the cosine of the angle. Filter 17 for the embodiment shown is placed at the output of the position measuring device 11 instead of in each channel of the input. By increasing the width of the signal, as when the count increases, the amplitude of the sinusoidal signal can be increased. For the particular example shown in FIG. 10, the angle is 18° for a count of 100.

When the error signal is reduced through zero when counting up, for example, the sign of the error signal changes and therefore, the $U/D_n$ line changes from high to low.

At the trailing edge of the clock pulse following the detected +TU coincidence, when counting up in the +$n$ channel when $U/D_n$ is high, flip-flop 85 is set high. At the trailing edge of the next clock pulse, occurring at $n+100+1$ time, gate 90 supplies a counting pulse to counter 89.

Similarly, at $-(+n+1)+100+1$ time, gate 90' supplies a counting pulse to counter 89' when counting down when $U/D_n$ is low. Also, when $U/D_n$ is low, gate 90 supplies a counting pulse to counter 89 at +$n$+100 time.

When the movable member 12 of the measuring device 11 is positioned at a desired location, the interval count increases in response to the error signal. As the count in the internal counter 4 increases, the error signal is reduced in magnitude. Therefore, when the internal count coincides with the position of the movable machine member (illustrated by numeral 12) the error signal changes from one value to another value because of the one bit delay provided by either flip-flop 85' or flip-flop 85. For example, when the internal counter 4 is coming up, a one bit delay is incurred through flip-flop 85. If the internal counter 4 is counting down, the one bit delay is incurred through flip-flop 85'.

When the error signal changes from one polarity to the other, the $U/D_n$ line changes states and the next RCT pulse to the internal counter 4 is inhibited as described in connection with FIG. 7. The display 21 then indicates the position contained in the external counter 20.

When $U/D_n$ is low, the Q output of flip-flop 85' will be switched low at $-(+n+1)+100$ flip-flop 85 of the +$n$ channel will be bypassed. The SIN output of inverting amplifier 98 is set high one bit later at $-(+n1+100$ and will be set low at +$n$+100 instead of at +$n$+100+1.

Although the internal count has not changed, switching the one clock period delay from flip-flop 85 in the +$n$ channel to flip-flop 85' in the −$n$ channel introduces the effect of a one down count. The change in the error signal from negative to positive causes the $U/D_n$ line to change from high to low thereby effecting the delay transfer from flip-flop 85 to flip-flop 85'. The RCT line would again be inhibited and the internal count would remain unchanged.

With the $U/D_n$ line again high after the error signal has caused another $U/D_n$ change, the Q output of flip-flop 85 would become low at +$n$+100 and flip-flop 85' would be bypassed as indicated above. In other words, gate 91' would be turned on and gate 91 would be inhibited. The data would seem to have been increased by a count of one.

The process of switching the $U/D_n$ line, thereby transferring the delay between the +$n$ and −$n$ channels, would continue until the movable member 12 of the measuring device 11 is moved to a new position. In that case, normal counting operations would be resumed.

It should be noted that other combinations of outputs from the A stages, and the flip-flops 86, 86', 87, 87' can be used to control Nand gates 94 and 95 for generating pulse width signals between other coincidence pulses as described in connection with FIG. 5. Appropriate connections to gates would be required. It should be pointed out that the present sine and cosine signals have a phase center at a reference count of 0,100. The phase center can be changed to other positions by connecting other outputs to gates 94 and 95.

Figure 7:
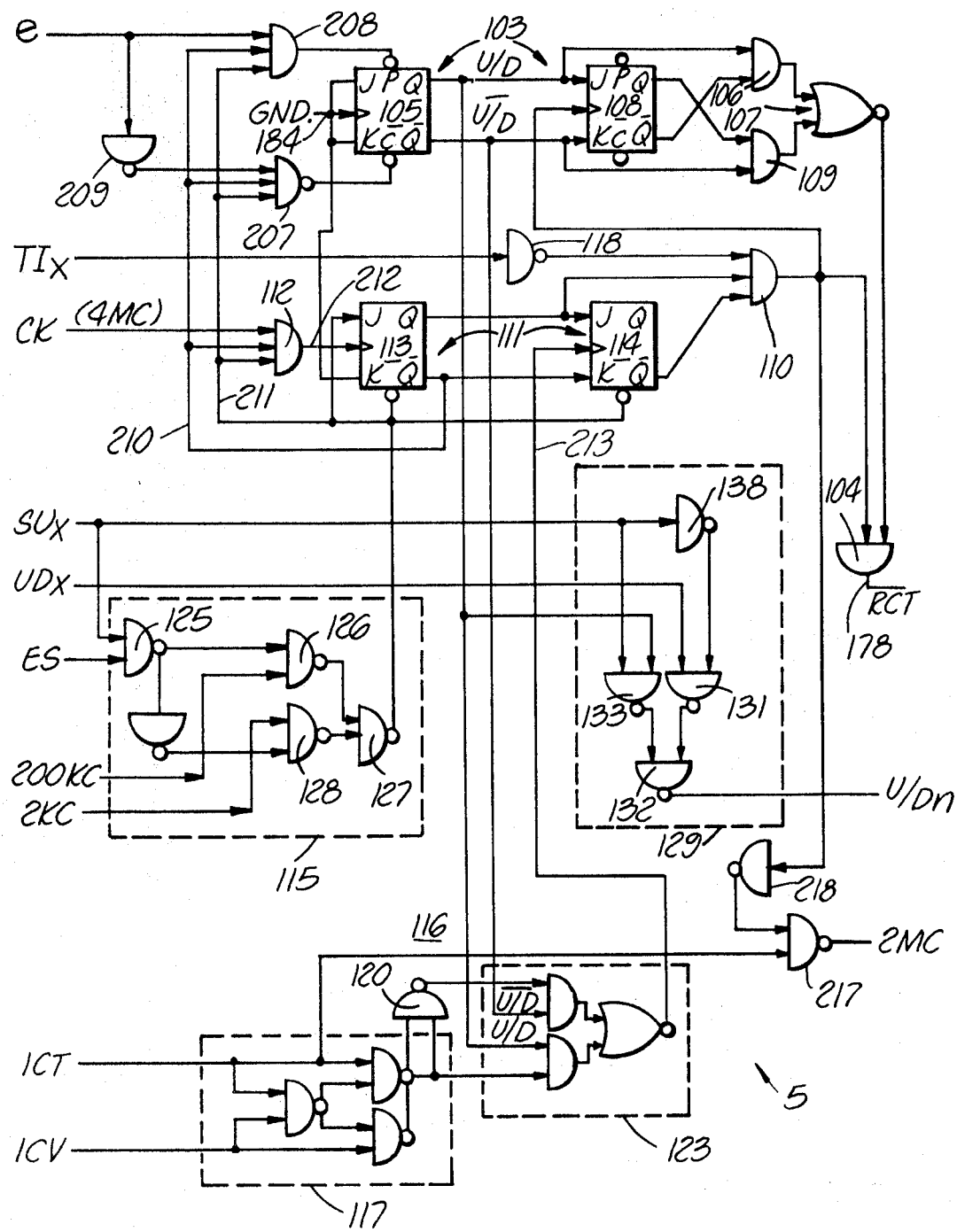
FIG. 7 represents one embodiment of internal control logic for controlling the internal counter and function generator during system operations.

FIG. 7 shows one embodiment of internal control logic 5 including inhibiting logic 103 for inhibiting or enabling And gate 104, depending on whether the error signal, e, has changed signs as a result of the last change in the internal count.

Assume, for example, that the error signal from the previous count had been positive. As a result, the U/D line from flip-flop 105 will be high. If the next error signal changed from positive to negative, the U/D line would change from high to low.

And gate 106, comprising part of exclusive Nor circuit 107, receives inputs from $\overline{Q}$ flip-flop 108 and U/D line. And gate 109 receives inputs from the Q output of flip-flop 108 and the $\overline{U/D}$ line.

Since the U/D line had been high prior to receipt of the last error signal, $\overline{Q}$ would be low and Q would be high. When the U/D line went low as a result of the change in the error signal, the output from exclusive Nor circuit 107 would be low and the output from And gage 104 would be inhibited.

If the inputs to the gates 106 and 109 had not changed signs, the output from the exclusive Nor circuit output 107 would be high and And gate 104 would be enabled to pass the next RCT pulse on conductor 178 from And gate 110 of the RCT pulse generating logic 111. Note that gate 110 also receives an input from Nand gate 118 which itself inverts the $TI_r$ from And gate 137 (FIG. 8). This insures that RCT pulses will not erroneously occur at the same time that biquinary counter 134 is advanced.

The output from And gate 110 toggles flip-flop 108 so that its Q and $\overline{Q}$ outputs indicate the states of the U/D and $\overline{U/D}$ lines respectively, at the time the last RCT pulse was generated.

The RCT logic 111 comprises And gate 112 for toggling flip-flop 113. The output from flip-flop 113 controls the output from flip-flop 114. The $\overline{Q}$ output from flip-flop 114 provides one input to gate 110. The other input is received from the Q output to flip-flop 113.

The K input is connected to ground. The $\overline{Q}$ output conductor from flip-flop 113 is indicated by numeral 210 and the J input conductor to flip-flop 113 is identified by numeral 211. The triggering input conductor to flip-flop 114 is identified by reference numeral 213. The triggering input to flip-flop 113 is identified by reference numeral 212. The output gate 112 is high upon receipt of a clock signal (CK), the 2 kc. or 200 kc. signals and the high $\overline{Q}$ output from flip-flop 113. Flip-flop 113, $\overline{Q}$, is set high by the output from frequency control logic circuit 115.

Figure 12:
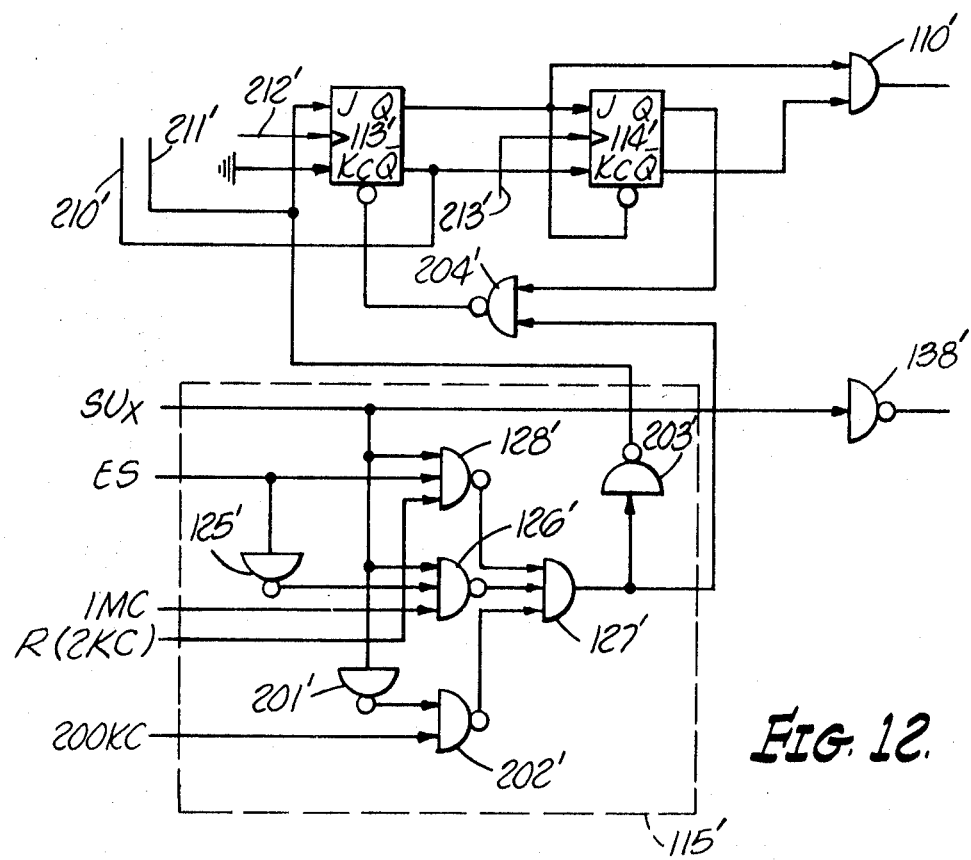
FIG. 12 represents a second embodiment of the internal logic of FIG. 7 having a capability for selecting different control system. counting rates.
Figure 13:
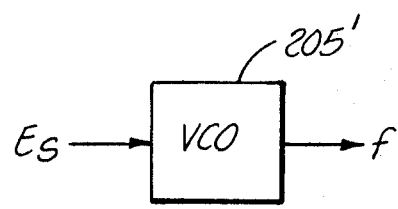
FIG. 13 illustrates a block diagram of a variable frequency oscillator controlled by the system error signal.

If the error signal is below a certain amplitude, the relatively low frequency signal, 2 kc. provides the signal to flip-flop 113. However, if the amplitude exceeds a predetermined level, the relatively high frequency signal, 200 kc. is provided. The high frequency signal also provided during the setup mode. As indicated in FIG. 12 and 13, by changing the logic, counting signals having higher frequencies may be used to increase the speed of system operation.

A signal is also received by flip-flop 114 from synchronizing logic circuit 116. The flip-flop 114 is toggled by the signal from synchronizing logic circuit 116 to terminate an RCT pulse when the synchronizing signal goes from high to low as a function of the counting direction of the internal counter 4 and the relationship of the input signals 1CT and 1CV from the reference counter 2 and internal counter 4, respectively.

The synchronizing logic circuit 116 comprises exclusive Nor circuit 117 which receives inputs, 1CT and 1CV, and provides a high output if both inputs agree. If both inputs disagree the output is low. The output is inverted by Nand gate 120. Exclusive Or circuit 123 provides a high output to flip-flop 114 when its inputs ($\overline{U/D}$ and 120; U/D and 117) disagree and a low output when the inputs agree. The U/D and $\overline{U/D}$ inputs are generated by flip-flop 105 which has its toggling input 184 connected to ground so that its Q and $\overline{Q}$ outputs are controlled by clear, C, and preset, P, inputs from Nand gate 207 and Nand gate 209, respectively.

Nand gate 207 is controlled partially by Nand gate 209 which receives the error signal, e, (sign) and also provides an input to And gate 208.

Therefore, assuming no inhibit output from Nor circuit 107, RCT pulses are enabled to be generated at coincidences between 1CT and 1CV counts when the internal counter 4 is counting up and at anticoincidences between the counts when the internal counter 4 is counting down. Otherwise, it would be possible to detect successive coincidences when counting up, and to miss coincidences and to therefore generate erroneous data when counting down.

It is noted that the $-n$ or nine's complement, count has an opposite polarity, or parity, to that of the $+n$ count. For example, if the internal counter 4 had a count of one, the nine's complement would be 1,998. As a result, when RCT pulses are generated for enabling the $-n$ count to change, the $+n$ count is also changed in the opposite direction. Both counts are changed in synchronism and gross counting errors are avoided.

For a specific example, assume that the internal counter 4 is set to count down from a count of 0001. The U/D line would be high. When the reference counter 2 contained a count of one, the output from exclusive Nor gate 107 would be high and when the reference counter 2 contained a count of two, the output would be low. When the output went low, and assuming no inhibit output from Nor circuit 107, an RCT pulse would be terminated from gate 104 to decrease the internal count by one.

If, however, the internal counter 4 had been set to count up from a count of two, the Nor output would be set high upon receipt of the next succeeding 1CT pulse from the reference counter 2 and the RCT pulse would be terminated from gate 104 upon receipt of the next succeeding 1CT pulse.

If tens complement instead of nines complement had been used, odd parity between the $-n$ and $+n$ counts would not exist, and it would have been possible to detect successive coincidences for one channel and completely miss coincidences in the other channel depending on the direction in which the internal counter 4 is counting.

Frequency control circuit 115 comprises Nand gate 125 which receives $SU_x$ and ES (error magnitude) signals from the external control logic 9 and rectification circuit 19, respectively.

Ordinarily, the $SU_x$ signal is low during the setup mode and is high at other times. The ES signal is normally high but is set low if the magnitude of the error signal exceeds a predetermined level.

If either signal is low, the output of the gate 125 becomes high and Nand gate 126 provides the higher frequency signal, 200 kc., to flip-flop 113, through Nand gate 127.

If both signal inputs to gate 125 are high, the lower frequency signal is passed through Nand gates 128 and 127 to flip-flop 113.

During part of the setup procedure, it is necessary to control the counting direction of internal counter 4 from external control logic 9. Logic 129 (FIG. 7) provides output signal $U/D_n$ for controlling the internal counter 4 during that portion of the setup mode as well as during normal operations.

When the $SU_x$ signal is low during setup, the output from Nand gate 138 is high. The output from Nand gate 133 is also high. Nand gate 132 is, therefore, set high if $U/D_x$ is high, forcing an upward count. If $U/D_x$ is low, Nand gate 131 is set high and Nand gate 132 is set low, for a down count.

During normal operations, $SU_x$ is high so that $U/D_n$ follows the setting of the U/D line from flip-flop 105, via Nand gate 133.

FIG. 12 shows a modification of internal control logic 5 described in connection with FIG. 7. The FIG. 12 embodiment provides a capability of switching from a basic frequency of 2 kc. to 1 mc. instead of from 2 kc. to 200 kc. Frequency control circuit 115 of FIG. 7 is substantially the only part of FIG. 7 which is changed. The changed frequency control circuit is referred to by numeral 115'.

Flip-flops 113' and 114' are identical to the flip-flops 113 and 114 illustrated in FIG. 7 except that the flip-flops are cleared in a different manner so that control is maintained by synchronizing logic circuit 116 over the trailing edge of the RCT counting pulse. Otherwise the RCT pulse would be terminated by the 1 mc. signal instead of by the output from the synchronizing circuit. Toggling inputs to flip-flops 113' and 114' are received on lines 212' and 213', respectively. The $\overline{Q}$ output from flip-flop 113' provides an input to gates 112, 207 and 208 as shown in FIG. 7. The J input to flip-flop 113 also provides inputs to the same gates 112, 207 and 208.

Nand gate 126' gates the 1 mc. timing signal to And gate 127' under the same conditions as Nand gate 126 gated the 200 kc. timing signal to Nand gate 127. The setup control signal, $SU_x$, provides an input to Nand gates 128' and 126', and Nand gate 201'.

The ES signal, which indicates an increased error signal, provides an input to Nand gates 128' and 125' as previously described in connection with FIG. 7. The 2 kc. reference signal, R, provides an input to Nand gate 128'.

During the setup mode, the 200 kc. timing signal provides an input to added Nand gate 202' which is controlled by the $SU_x$ signal through Nand gate 201'.

Nand gate 127 was replaced by And gate 127'. The output from 127' with the Q output from flip-flop 114 through Nand gate 204' clears flip-flop 113. The output from And gate 127' through Nand gate 203' also provides a signal to the J input of flip-flop 113 so that the next clock input, after gate 203' goes high, sets the Q output to "1." When the Q output of flip-flop 113 is low, flip-flop 114 is cleared.

The remaining portions of the FIG. 7 embodiment are unchanged.

FIG. 13 shows a block diagram embodiment of a modification to FIG. 12. Voltage control oscillator 205' (VCO) receives ES as a control signal and provides a variable frequency output signal $f$. In operation, the output signal would be used to replace the 1 mc. input signal to Nand gate 126' of FIG. 12.

The voltage control oscillator 205' may comprise a voltage sensitive capacitor device biased by the control signal, ES. Such VCO's are well known in the art.

When the magnitude of the error signal, ES, increases above a predetermined value, instead of switching from the 200 kc. signal directly to the 1 mc. signal, the switch would be to a frequency which would increase as a function of the increased error signal over a range of, say, 200 kc. to 1 mc. The frequency of the output signal would be a function of the magnitude of the control signal.

Figure 8:
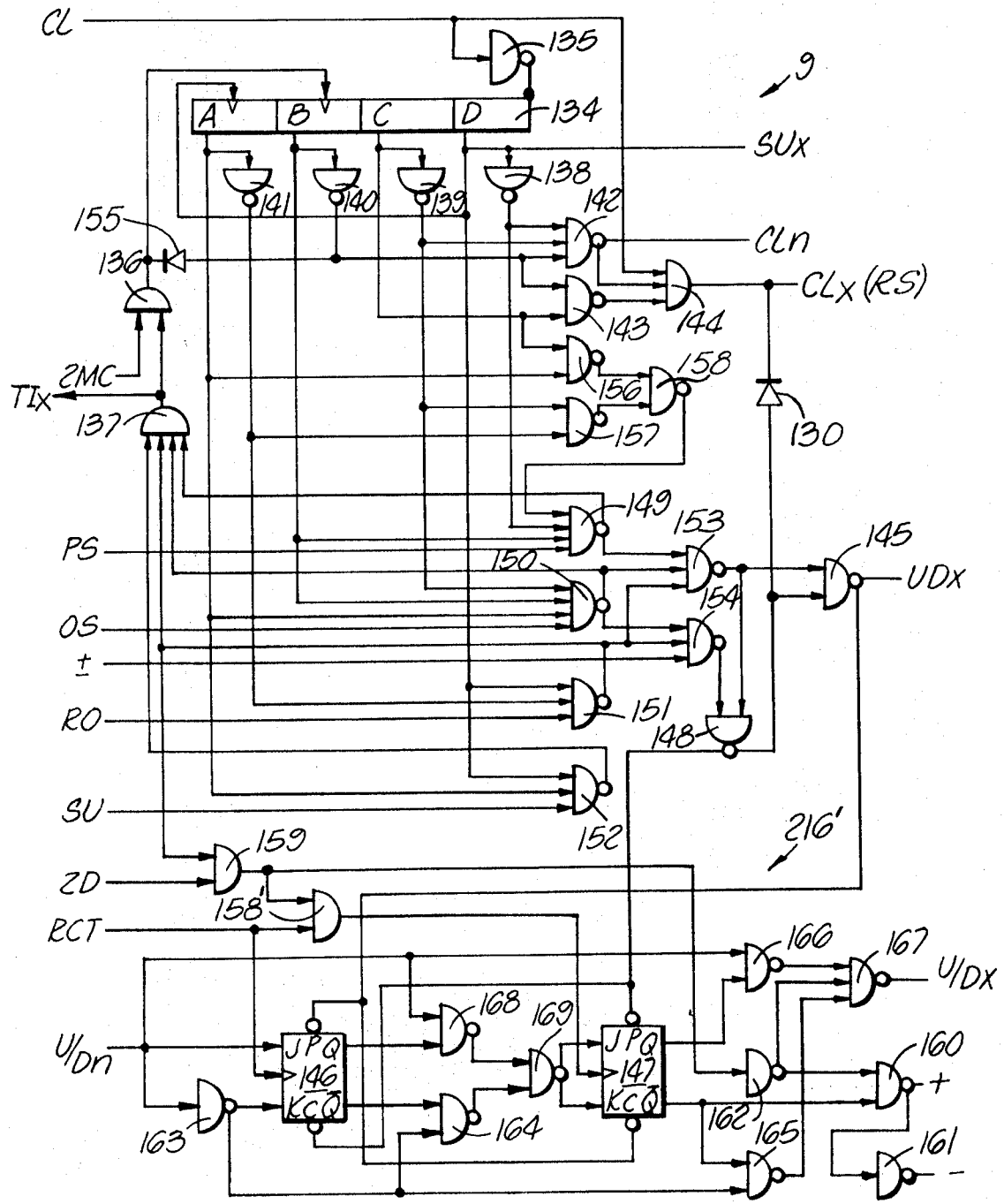
FIG. 8 represents one embodiment of external control logic for controlling the sequence of operations of the system during the setup and readout modes.

FIG. 8 shows one embodiment of external control logic 9 comprising biquinary counter 134 having series connected B, C, D and A decade counters. Nand gate 135 receives a clear, CL, signal from reset switch 25, FIG. 1, to set the counter 134 to a count of nine indicating normal readout. The reset switch 25 is also depressed (or operated) prior to initiating a setup mode as described below.

Two mc. counting pulses are passed through And gate 136 as a function of the count in counter 134. These toggle pulses to counter 134 are received by the B decade instead of by the A decade for implementing biquinary counter 134.

Four signals having logical states as a function of the count comprise inputs to And gate 137 which has its output connected to And gate 136. When the inputs to And gate 137 are all high it enables gate 136 to pass the 2 mc. signal. The 2 mc. signal, for the example given, is used to provide counting pulses to counter 134 for preventing interference between the biquinary counter 134 and other counters, 2 and 20, in the system. Its counting rate is thus substantially faster than the maximum rate at which the other counters are allowed to count. The 2 mc. signal is generated by Nand gates 217 and 218 shown in FIG. 7 in response to a 1CT signal and the signal from And gate 110.

Nand gates 138, 139, 140 and 141 invert the state of the outputs from the counter decades to provide proper inputs to the decoding logic described in the following paragraphs, of the external control logic 9.

At the beginning of system operation, reset switch 25 is depressed to set the counter 134 at a count of nine, or readout mode. Subsequently, when the mode switch is placed in the setup mode, the counter 134 begins a sequential count for completing the setup mode.

The decoding logic comprises Nand gate 142 for decoding the counts 0 and 5 to generate a clear signal, $CL_{in}$, to the internal counter 4. Gate 142 receives inputs from Nand gates 138, 139 and 140, as well as a strobe input from gate 136 via diode 155. This strobe prevents spurious signals, and hence incorrect decoding, from occurring when counters 0 and 5 are decoded. The output of gate 142 also provides an input to And gate 144.

And gate 144 receives the decoded counts 0, 2, 5, 7 and the CL. signal from the push button reset switch 25 for generating clear signal, $CL_x$, to the external counter 20. The gate 144 receives inputs from the CL line, Nand gate 142 and Nand gate 143. Nand gate 143 receives inputs from Nand gate 140, and directly from the C stage of the counter 134.

Signal $SU_x$, into the internal control logic 5 is taken directly from the D stage. It is high at counts of 4 and 9. Otherwise, it is low, thereby indicating the setup mode.

The direction in which the internal counter 4 counts during certain periods of setup is controlled by signal $UD_x$ from Nand gate 145, which also provides a preset signal to flip-flop 146 and a clear signal to flip-flop 147 of the $U/D_x$ control logic. $U/D_x$ logic controls the direction in which the external counter 20 counts. Nand gate 145 is coupled to the $CL_x$ output of gate 144 via diode 130 to insure that the counting direction of internal counter 4 will not be set erroneously during a "clear" operation.

At count 4, Nand gate 151 is set low since the RO line is high. Nand gates 153 and 154 are high so that Nand gate 148 is low and Nand gate 145 is high. As a result of gate 148 being low, flip-flop 147 is preset high and flip-flop 146 is cleared.

The state of the $U/D_n$ line during count 4 is passed to the output of the $U/D_x$ line so that the external counter 20 follows the internal counter 4. As will be described subsequently, during count 4, the counters, 4 and 20, are counting the offset number. For that reason, the external counter 20 must follow the internal counter 4.

Nand gates 149, 150, 151 and 152 decode counts of 1 and 8, 6, 4 and 9, respectively. Each of the gates 149–152 receives appropriate input signals for enabling the decoding. For example, Nand gate 149 receives a signal from Nand gate 158 which has inputs from Nand gates 156 and 157. The gates 156 and 157, respectively, receive inputs directly from the A and C stages and from the inverted outputs of the C and A stages of the counter 134.

Since the part start number has a − or + sign, the internal counter 4 will be commanded by RCT pulses from the internal control logic 5 to count up for a − number and down for a + number during counts 1 and 8. During count 6, both counters, 4 and 20, count up.

Part start coincidence signal, PS, provides an additional input to Nand gate 149 which also receives input signals from stage B of the counter 134 and gates 138 and 158. At the counts of 1 and 8, the state of PS is inverted by gate 149. When there is coincidence the output is high and gate 137 becomes high. A new count can be entered into counter 134.

The offset coincidence signal, OS, provides an input to Nand gate 150. Readout mode signal, RO, provides an input to Nand gate 151 and setup mode signal, SU, provides an input to Nand gate 152. When the counter 134 has counted to corresponding decoded counts, these gates (150, 151, 152) are controlled by the state of the input signals.

Logic 216' generates $U/D_x$, and ± signals as described below.

The $U/D_x$ control logic comprises JK flip-flops 146 and 147 having triggering inputs from the RCT line and from And gate 158', respectively. And gate 158' receives inputs from And gate 159 and RCT. And gate 159 is high when the external counter 20 is in a zero condition (ZD) and the output from Nand gate 151 is high.

Nand gates 160 and 161 control the + and − indicators, respectively, for the display 21. Nand gate 161 inverts the output of Nand gate 160. Nand gate 162 receives an input from gate 159 and provides a low output for setting gate 160 high when a zero condition exists in the external counter 20. At other times, the +, − gates (160 and 161) are controlled by the state of $\overline{Q}$ output from flip-flop 147 as a function of the state of the $U/D_n$ line and the passing the external counter 20 through zero, and therefore from one counting direction to another. A signal on the line identified by ZD indicates when the counter 20 is at zero.

Nand gate 163 inverts the signal on the $U/D_n$ line and provides an output to the K input to flip-flop 146, Nand gate 164, and Nand gate 165.

If the $U/D_n$ line from the internal control logic 5 is high for counting up, Nand gate 166 sets Nand gate 167 high. If the $U/D_n$ line is low for counting down, Nand gate 165 sets gate 167 low. The output from Nand gate 162 is high. It is assumed that flip-flop 147 is in the logic one state so that its Q output is high and its $\overline{Q}$ output is low.

Nand gates 164, 168 and 169 together with gates 158' and 159 properly control flip-flop 147 so that the state of the $U/D_x$ line will be changed with respect to the state of the $U/D_x$ line. The Q output from flip-flop 147 controls the sign of the display 21 as indicated above.

During normal readout operations in the count 9 state of biquinary counter 134 the $U/D_n$ state is passed through the logic to the $U/D_x$ line. and thereafter tempering said broach in a tempering operation in which the straightness of the broach is maintained within limits during air cooling by reverse bending. This assumes a minus (−) input to gate 154 so that gate 148 previously set flip-flop 147 during count 8. When a zero is detected by gate 159 while counting down, the next RCT pulse causes the flip-flop 147 to toggle and reverse the relative direction of the external and internal counters.

For example, during a measuring operation the internal and external counters 4 and 20 may be counting down. If the workpiece (represented by numeral 214A in FIG. 11) has a zero position, it may be necessary to to move a probe (represented by numeral 215 in FIG. 11) on the movable machine member, for example, through the zero without reversing the direction of machine motion. The external counter 20 has a plus or minus indicator (21') so that it can count through zero while the internal counter is counting up or down. The logic 216 described in the previous paragraph is provided for reversing the counting direction and sign of the external counter 20 when a zero condition is detected. Thus the displayed dimensions increase + and − on either side of zero.

A summary of the decoding operation during the setup mode is shown below in table I.

TABLE I

| Biquinary Counter | Decoded Count | |
|---|---|---|
| A B C D | | |
| 0 0 0 0 | 0 | $CL_n$ and $CL_x$ (Clear internal and external counter) |
| 0 1 0 0 | 1 | PS counted into external and internal (up if + and down if −) counters |
| 0 0 1 0 | 2 | $CL_x$ |
| 0 1 1 0 | 3 | No action |
| 0 0 0 1 | 4 | Servo (External counter slaved to internal counter in count and direction) |
| (Offset number computed and displayed; operator sets offset in thumbwheel and mode switch to readout) | | |
| 1 0 0 0 | 5 | $CL_n$ and $CL_x$ |
| 1 1 0 0 | 6 | OS counted into internal and external counters |
| 1 0 1 0 | 7 | $CL_x$ |
| 1 1 1 0 | 8 | PS algebraically added to OS in internal counter; PS counted into external counter |
| 1 0 0 1 | 9 | Normal readout |

Figure 9:
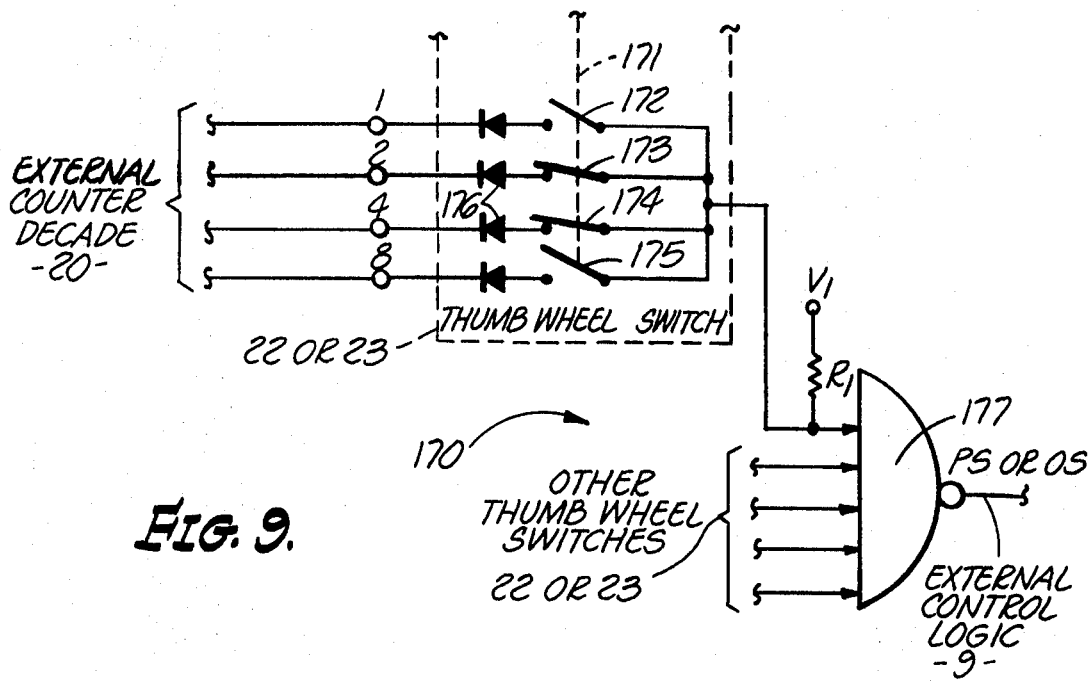
FIG. 9 represents one embodiment of logic for determining coincidence between the external counter and the numbers contained in the storage devices.

FIG. 9 illustrates an embodiment of a simple logic circuit, shown as logic 170, for detecting coincidence between a decade of the external counter 20 and one BCD switch of the part start (22) or offset (23), storage devices. The logic 170 is included as part of the part start or offset storage devices 22 and 23 shown generally in FIG. 1. It should be understood that similar circuits are provided for each thumbwheel switch of both storage devices 22 and 23, and each decade of the external counter 20. It should also be understood that the circuit is only useful for unidirectional counting; a full decoding circuit would be required for counting in both directions as in the usual case.

The BCD thumbwheel switches (22, 23) are manually positioned to indicate a selected number. The number on the part start storage device 22 indicates a starting point on a workpiece whereas the number on the offset storage device 23 indicates the offset number. Mechanical connection 171 extends from the thumbwheel illustrated to switches 172 through 175. The switches are closed or opened depending on the position of the thumbwheel (22, 23).

The particular switch position illustrated indicates that the number 6 has been set on the thumbwheel switch (22, 23).

Prior to achieving coincidence, the closed switches are connected to electrical ground through one or both diodes 176 and a switching device, such as a transistor (not shown), in the external counter 20. As a result, voltage $V_1$ is dropped across resistor $R_1$ and the input to Nand gate 177 is low. When the count in the external counter 20 is equivalent to the number set on the thumbwheel switch, the diodes become back biased and cut off. As a result, the input from that thumbwheel switch (22, 23) to gate 177 becomes high.

For the particular embodiment shown, when all inputs to Nand gate 177 are high, coincidence between the decades of the external counter 20 and the position set on the storage device (22, 23) is indicated. The output from the gate 177 (either PS or OS) is connected to the external control logic 9 as shown in FIG. 1 and described in connection with FIG. 8, so that the next operation in the setup mode can be initiated.

The operation of the system is divided into a setup mode and a normal readout mode. For purposes of this description of operation, it is assumed that a workpiece, or part, has been properly positioned on a machine work table and the dimensions of the workpiece are to be measured and compared with dimensions shown on drawings.

The setup mode is used to determine the difference between the zero reference of the workpiece on the machine and the zero reference of the position measuring device 11 and to correctly set the counters 4 and 20 of the system prior to beginning the normal readout mode.

Figure 11:
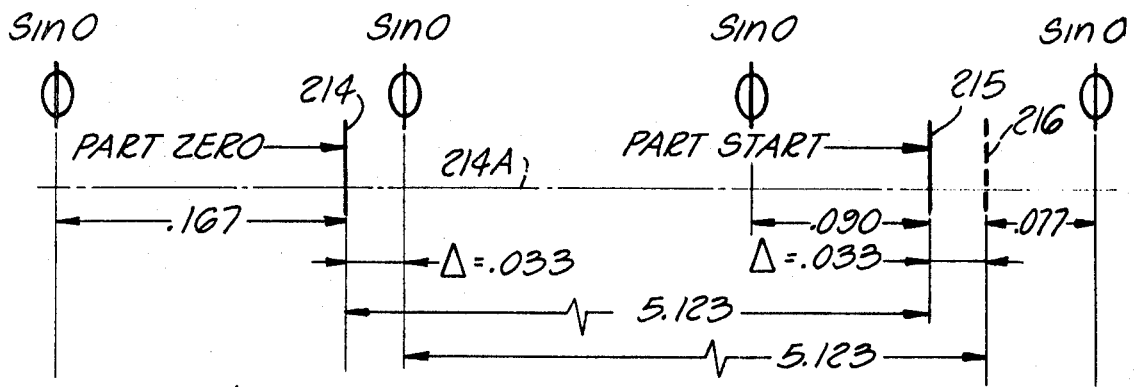
FIG. 11 illustrates an example of the difference between machine and measuring device reference positions for a selected starting position.

In the setup mode, the movable member of the machine, for example a probe (215, FIG. 11) is manually positioned as accurately as possible to a starting position on the workpiece (214A, FIG. 11).

After the machine probe 215 has been placed by the operator at a selected part start position, the corresponding dimension manually is set into part start thumbwheel switch 22 on the front panel (not shown). The start part position may correspond to a part zero 214 or it may be a position displaced therefrom, as shown in FIG. 11. Part zero 214 represents a selected point on workpiece 214A from which part dimensions are to be measured.

Line 215 (see FIG. 11) represents the position of a probe or other movable machine member (and the movable member of device 11) relative to workpiece 214A. For this example, a part start position of +05.1230 inches, measured with respect to part zero 214 has been selected. In other cases, a negative number could be selected. The symmetrically spaced null or sine zero positions of measuring device 11 also are shown in FIG. 11; these nulls are designated "sin 0." For convenience, some sine zero positions are omitted in the figure.

For the example shown, movable member 12 is situated at an actual position a distance of 0.0900 inches from one of the sine 0 null positions of device 11. Had the part start dimension been measured from a zero reference corresponding with one of the sine's, movable member 12 would have been situated at line 216. The difference between positions 215 and 216 is the displacement, or offset, of the workpiece part zero with respect to a sine zero of measuring device 11. This offset is designated Δ.

Mode switch 24 is switched to the setup position and the internal counter 4 and external counter 20 automatically are cleared to zero. Then the counters, 4 and 20, count to the starting position contained in the thumbwheel switches 22. The internal counter 4 is forced to count with the external counter 20 although it has a lesser capacity. For the particular embodiment described, the internal counter 4 can count 2,000 pulses over a counting range of from 0 through 1999 before recycling.

During the setup mode, the external control logic 9 directs the system to use the increased frequency rate.

When there is coincidence between the part start thumbwheel switches 22 and the external counter 20, the display 21 will indicate +05.1230 and the internal counter 4 will contain 1,230. The biquinary counter 134 then increases its count by one, at which time the external counter 20 is cleared to zero. The biquinary counter 134 takes two more steps to 4, and the digital count 1230 in the internal counter 4 is converted into sine and cosine analog signals having amplitudes proportional to the sine and cosine of the angle represented by the count.

If the position of the probe 215 does not correspond to the position represented by the signal, an error signal will be generated by the position measuring device 11. The error signal causes the counter 4 to count until the error signal from the position measuring device 11 is nulled. When the error signal nulls, the count in the internal counter 4 will indicate the correct position of the movable member 12 in the operating cycle of the measuring device 11, i.e., it will indicate the fractional part of the position of said probe 215 which is within a cycle of the position measuring device 11. The number of counts indicates the difference between the zero references.

Since the external counter 20 is driven simultaneously with the internal counter 4, and since the display 21 follows the external counter 20, the difference between the zero reference positions is shown on the display 21. this is the offset number.

For the example given, and assuming that the probe is located at 0.0900 inches within a cycle of the position measuring device 11, the internal counter 4 would count down from 1230 to 0900. That is, the counter 4 would count down by 330 pulses and the external counter 20 previously cleared to 000000 would count down to 999670. The number 9,670 represents the offset number.

The offset number is manually placed on the offset thumbwheel coincidence switches 23. The mode switch 24 is set to readout, the biquinary counter 134 advances to 5, and both counters (4 to 20) are cleared to zero. The biquinary counter 134 advances to 6, and the counters 4 and 20 are permitted to count up to the value contained in the offset thumbwheel switches 23. Since the number exceeds the capacity of the internal counter 4, the internal counter 4 will recycle four times and will finish with the count of 1,670 when coincidnece is achieved between the external counter 20 and the offset thumbwheel switches 23.

After coincidence is reached the biquinary counter 134 is advanced to 7, where the external counter 20 is cleared, then to 8, where both counters (4 to 20) are permitted to count to the part start number stored on the part start thumbwheel switches 22. The internal counter 4 counts simultaneously. Since the number exceeds the capacity of the internal counter 4, it will recycle and finish with the sum of the two numbers 5.1230 and 1670, and 0900, which is the actual position of the probe 215 within one cycle of the position measuring transformer 11. The part start position will be indicated on the display 21.

This operation is summarized in the following table II showing the contents of the internal and external counters at each step of the setup sequence. In table II the step number corresponds to the decoded count of biquinary counter 134 (as listed in table I hereinabove). The values given for the contents of internal counter 4 and external counter 20 correspond to the example illustrated in FIG. 11.

TABLE II

| Setup step number [1] | State of internal counter 4 | State of external counter 20 [2] | Action |
| --- | --- | --- | --- |
| 0 | 0000 | 000000 | Clear internal and external. |
| 1 | 1230 | 051230 | Count to part start. |
| 2 | 1230 | 000000 | Clear external. |
| 3 | 1230 | 000000 | No action. |
| 4 | 0000 | 999670 | Servo to null. |
| 5 | 0000 | 000000 | Clear internal and external. |
| 6 | 1670 | 009670 | Count to offset. |
| 7 | 1670 | 000000 | Clear external. |
| 8 | 0900 | 051230 | Count to part start. |
| 9 | 0900 | 051230 | Servo to null—will stay until machine moves. |

[1] Decoded state of biquinary 134.
[2] Always + for this example.

NOTE.—Part start swiches 22 set to +05.1230 throughout. Offset swiches 23 set to 9670 at end of step 4.

As a result, when the normal readout operation begins, the counters (4 to 20), will be properly set to begin counting up or down depending on which way the probe is moved.

Each time the probe 215 is moved to a new position, the position is indicated by the display 21.

The operation is continued until all measurements have been made.

Interruptions may occur in the form of planned shutdowns such as at the end of a normal working day or in the form of unplanned shutdowns such as may occur as a result of a power failure or accidental turnoff of the equipment.

In the event of a planned shutdown, the operation may be easily resumed without repeating the entire setup operation. In a particular case, the last displayed dimension from each axis is transferred into its respective part start thumbwheels 22, etc., and the system is turned off. When it is desired to resume the operation, the system is switched into setup until the display 21 settles down. Subsequently, without altering the thumbwheel switches 22, the mode switch 24 is switched to readout and the measuring operation is resumed.

Upon resuming operation, the visual display 21 should indicate the position stored on the part start thumbwheel switches 22. If during the shutdown period, the machine had been moved from this position, within plus or minus one-half of a cycle of the position measuring device 11, the display will accurately indicate the new position.

In the event of an unplanned shutdown, the operator may also resume normal operations without extensive setup procedures by measuring the position of probe 215 at the time of shutdown to within one-half cycle of the position measuring device 11 for example, 0.1 inches. The position is set into the part start thumbwheel switch 22 and the mode switch 24 is switched to its setup position. After the display 21 settles, the operator switches into the readout mode and proceeds with normal measuring operations.

Often an operator may desire to know the position of the probe 215 within a cycle of the position measuring transformer 11.

In the present system, the nearest null, or sine zero, position can be determined by switching to setup mode with a zero part start thumbwheel 22 setting. The internal counter 4 will count to the position of the probe 215 in a cycle and the external counter 20 will follow. The external counter 20 will then display the distance of the probe 215 from the nearest sine zero position. The probe 215 can now be placed at a sine zero by moving it until the display 21 shows an even thousand in its last four places; i.e., 0000, 2000, 4000, 6000 or 8000.

SUMMARY OF ADVANTAGES

The following paragraphs summarize certain of the advantages of a specific embodiment of the system. The examples are selected for convenience only.

First, circuit 116 (FIG. 7) insures that the RCT pulses are each at least one clock period wide. The pulses are generated as a result of the 4 mc. clock (CK) and a toggling pulse rate, which may be either 2 kc., 200 kc., 1 mc. or a variable frequency, depending on the particular mode of system operation. The RCT pulses are synchronized to the 4 mc. clock rate regardless of the origin or repetition rate of the toggling frequency. In addition, circuit 116 described as a synchronization circuit, insures termination of an RCT pulse so that with reference to the $+n$ channel the system avoids detecting two successive coincidences during an up count and avoids missing a coincidence during a downcount. The reverse is true with respect to the $-n$ channel.

Since the coincidence pulses are directly responsible for the data generated, it is important that the pulses be accurately detected.

It was also shown that the minus coincidence signals ($-$Th, $-$H and $-$TU) were developed by use of 9's complements in the comparator circuits 3. As a result, the signals can be generated in a much simpler manner as compared to using the 10's complement approach. However, if a 10's complement method had been used, both plus and minus coincidence would occur at 0 and 1000. Since the synchronization circuit 116 must handle the conditions outlined above for the up and down counts, it would be impossible for the circuit 116 to generate a meaningful RCT termination if simultaneous coincidences occurred.

Function generator 10 (FIG. 6) develops pulse signals based on the −TU and +TU coincidence as detected by the Tens and Units plus and minus comparator circuits 3 (FIG. 1). Since the function generator 10 requires 500 clock pulses to generate one quarter of a cycle of the data used in developing the signals, the combined TU coincidence necessitates counting only 5 TU coincidences rather than 500 U (unit) coincidences.

As described in connection with FIG. 7, RCT pulses are generated by the combination of the clock signal (4 mc.) and by any one of a number of other toggling signals (2 kc., 200 kc., etc.). Since the RCT pulses directly control the rate at which the data changes, an ideal means is thereby provided for adjusting the rate as a function of system requirements. For example, during the normal readout mode when the counters 4 and 20 are tracking machine movements, the frequency may be 2 kc. However, if the machine motion exceeds a rate which might result in the loss of data synchronization (between cycles of the measuring element and coarse count) the frequency may be raised to, for example, 1 mc., causing the data to change at a rate which is 500 times faster than at the 2 kc. rate. In addition, for finer control of the data change, it is possible to employ a variable frequency oscillator 205' (FIG. 13) whose frequency may be proportional to the magnitude of the error signal (ES).

The use of the 9's complements in the −U, −T, −H and −Th comparator channels results in the development of the −n coincidence to occur 1 bit sooner than it would normally occur if the 10's complements were employed.

As a result, the shift has the effect of being a one-half bit error in the portion represented by the data controlled by the −n coincidence detection circuit. In order to correct the error, a 1 bit delay is introduced into the −n channel.

The corrective circuitry (see FIG. 6) provides a means for avoiding oscillation of the least significant digit in the visual display 21 when a two state closed loop electronic servo (not shown) is employed. In a two state system, the error signal, from the measuring device 11 commands an electronic servo (not shown) to either count up or count down. A zero state does not exist. A two state type of system inherently exhibits a 1 bit oscillation when the machine member (not shown) is at rest. A means for eliminating this condition is to employ a 3 state system rather than the 2 state. This provides Up, Down and Stop or null detection signals. By suitable adjustment of the null band, jitter free visual display on display 21 can be achieved. However, in many instances, this approach results in a reduction of system sensitivity around null. The system described herein employs a two state approach but eliminates the visual jitter in the least significant digit.

If the machine member (represented by numeral 12 in FIG. 1 and by numeral 215 in FIG. 11) is moving in a positive direction, the internal counter 4 will be commanded to count up. When machine motion has ceased, the counter 4 continues to count up for reducing the error signal until the error signal passes through zero. The reversal of the error signal causes the Up-Down line to switch into the Down mode. This switchover inhibits the next RCT pulse from entering the counters (4 to 20). Simultaneously, the 1 bit delay in the +n channel is transferred into the −n channel and cause the data to increase by 1 bit. The change in data causes the error signal to reverse its phase thereby reversing the Up/Down line from down to up. Again an RCT pulse is inhibited and now the 1 bit delay is transferred from the −n channel back into the +n channel. This causes the function generator 10 to produce a 1 bit change in the data in the opposite direction. Again, the error signal reverses and the process is repeated as described above. This action continues as long as the movable member (12 and 215) is stationary. Note the data oscillates 1 bit but due to the RCT inhibit, the counters (4 and 20) do not change state. Since the display 21 is slaved to the external counter 20, it also remains unchanged. The circuit may be adjusted so that the display will "lock-up" on either the "low" or "high" digit.

Although the invention has been described and illustrated in detail, it is understood that the same is by way of illustration and that the scope of the invention is limited only by the terms of the appended claims.

I claim:

1. A system for measuring the position of a movable machine member relative to a workpiece fixed to the machine including a position-measuring device having a plurality of operating cycles for generating an error signal as a function of the position of the movable member relative to the workpiece, said position-measuring device having a reference position relative to a reference position for said workpiece, said system comprising, digital means responsive to said error signal for measuring the difference between said reference positions, means for storing said difference, said digital means responsive including, means for storing a selected workpiece starting position number, first means for counting to said starting position number, and second means for counting the fractional part of said position number within a cycle of the position-measuring device as measured from the workpiece reference position, means for changing the count of said fractional part by an amount equal to said difference, said means for counting the fractional part including means for summing said stored difference and said fractional part for referencing the movable member to the reference position of the position measuring device and said system further including, display means, and said first means for counting to the starting position includes means for controlling said display means and for counting to the stored starting position simultaneously with the counting of said sum by said second means for counting.

2. The combination recited in claim 1 wherein, said means for storing the starting position is electrically connected to a common point between said display means and said means for counting to said position, and the means for storing said difference is electrically connected to a common point between the least significant digits of said means for counting to said starting position and the display means, and said digital means responsive includes means for inhibiting counting in said means for counting to the starting position when its count is equal to said stored position, and means for inhibiting the counting in the means for counting to said fractional part when the count equals the stored difference.

3. A system for measuring the position of a movable machine member relative to a workpiece fixed to the machine including a position-measuring device having a plurality of operating cycles for generating an error signal as a function of the position of the movable member relative to the workpiece, said position-measuring device having a reference position relative to a reference position for said workpiece, said system comprising, digital means responsive to said error signal for measuring the difference between said reference positions, means for storing said difference, said digital means responsive further including, means for cyclically generating a reference count, first means for counting the fractional part of the position of the movable machine member in a cycle of the position-measuring device, means for comparing said reference count with the count of the means for counting the fractional part and with a complement of said count and for generating pulses at coincidence between said counts and at equal intervals thereafter within said reference cycle, said pulses being symmetrically spaced, means responsive to selected ones of said pulses for generating pulses having widths related to the count in said first means, said pulses being filtered to produce analog signals having amplitudes proportional to the trigonometric function of the angle represented by the count.

4. The combination recited in claim 3 including display means for displaying a position of said movable member and wherein said digital means responsive further includes means for changing the count of said first means until said error signal changes from one state to another, means for sensing the change in states of the error signal for inhibiting the first means and the display when the error signal undergoes changes in states after said movable member has been positioned.

5. The combination recited in claim 4 wherein said means for changing said count includes means for changing the count at binary "1" coincidence between said means for cyclically generating a reference count and said means for counting said fractional part when said means for counting the fractional part is counting down and means for changing said count at binary "1" anticoincidence when said means for counting the fractional part is counting up.

6. The combination recited in claim 5 wherein the complement of said count is a nines complement and said means for changing the count changes the complement of the count at binary "1" coincidence when the means for counting the fractional part is counting up and at binary "1" anticoincidence when the means for counting the fractional part is counting down.

7. The combination recited in claim 3 wherein said digital means responsive to selected ones of said pulses comprises, first gating means for receiving pulses generated at coincidences between said reference count and the count of said means for counting the fractional part, counter means responsive to an output pulse of said first gating means for being set below the capacity of said counter means at said coincidence and for being set to capacity upon receipt of a subsequent output pulse for said first gating means, second gating means responsive to the count in said counter for generating output signals, first complementary gating means for receiving pulses generated at coincidences between said reference count and the complement of the count in the means for counting said fractional part, counter means responsive to an output pulse of said first complementary gating means for being set below the capacity of said counter means at said coincidence and for being set to capacity upon receipt of a subsequent output pulse from the first gating means, second complementary gating means responsive to the count in said counter means for generating output signals, output gating means responsive to selected outputs of said second gating means and said second complementary gating means for generating a first pulse width signal representing a trigonometric function of the count in the means for counting the fractional part and responsive to other outputs from said second gating means and said second complementary gating means for generating a second pulse width signal representing a different trigonometric function of the count contained in said means for counting the fractional part.

8. A computer for determining the values A and B of the fraction F of a number N, where F is the sum of A and B, said computer having:

1. a display slaved to a first counter,
2. a second counter of more limited capacity than said first counter,
3. a first switch for storing the number N,
4. means for transferring N from said switch to said first counter and display, said second counter being slaved to said first counter and storing the digits of F,
5. means for clearing said first counter and said display, and
6. means for measuring the value B and for changing the contents of said second counter to correspond with said value B, said first counter being slaved to said second counter whereby the contents of said first counter and said display change by an amount equal to the difference F-B, said difference corresponding to A.

9. A digital position-measuring system for the relatively movable members of a machine wherein the movable machine member is suitably driven, a position-measuring device having a stationary element for attachment to the stationary machine member and having a movable element for attachment to the movable machine member, said elements being inductively related, said position-measuring device supplying an error signal depending on a comparison of the relative displacement of said inductively related elements with an input of trigonometrically related signals to said position-measuring device, means for generating said trigonometrically related signals in response to said error signal, said generating means including control means providing outputs of first and second rectangular wave signals including fundamental frequency components having amplitudes proportional to sine $\theta$ and cosine $\theta$, respectively, where $\theta = 2\pi n/N$, and where n represents a digital input signal stored in said control means and constitutes a number between O and N, and where N represents the cyclical range of counts of a counter fed by a clock, said error signal causing said control means to operate and change the values of said trigonometrically related signals in a direction reducing said error signal to a small value, another counter slaved to said control means and a digital display responsive to the contents of said other counter.

10. A digital position-measuring system according to claim 9 further comprising means for causing the sign of said error signal to oscillate from plus to minus, and means for inhibiting generation of pulses operating said other counter and said display while the sign of said error signal is oscillating and while said means for generating trigonometrically related signals remains active.

11. A digital position-measuring system for the relatively movable members of a machine wherein the movable machine member is suitably driven, a position-measuring device having a stationary element for attachment to the stationary machine member and having a movable element for attachment to the movable machine member, said elements being inductively related, said position-measuring device supplying an error signal depending on a comparison of the relative displacement of said inductively related elements with an input of trigonometrically related signals to said position-measuring device, means for generating said trigonometrically related signals in response to said error signal, said generating means comprising means for deriving said trigonometrically related signals from coincidence pulses between the contents of a reference counter and the contents of a control counter, said error signal causing said control counter to operate and change the values of said trigonometrically related signals in a direction reducing said error signal to a small value, the improvement wherein a generator supplies different values of frequency to cause said counters to cycle at different rates, and means responsive to said error signal to select a frequency to cause said control counter to cycle at a fast rate when the value of said error signal is high.

12. A digital position-measuring system according to claim 11 wherein said generator comprises a source supplying pulses of frequency $f$ to advance said reference counter, said different values of frequency being derived by division of said frequency $f$ in said reference counter.

13. A digital position measuring system according to claim 12 wherein said reference counter cycles at a constant rate related to $f$, and including means for causing said control counter to cycle at progressively lower rates as the magnitude of said error signal decreases from a high value.

14. A digital position measuring system according to claim 12 further comprising means for generating count pulses to increment or decrement said control counter, depending on the sign of said error signal, the frequency of said count pulses being $f/A$ when the magnitude of said error signal is high and $f/B=F$ when said error signal is low, wherein a and B are integers and A<B.

15. A digital position measuring system according to claim 14 wherein F corresponds to the fundamental frequency of said error signal, and wherein B corresponds to the maximum count of said reference counter.

16. A digital position measuring system according to claim 15, said position measuring device having a plurality of cycles of equal spacing X determined by equally spaced sine zero positions, a unit count of said control counter representing the spacing X/B.

17. A digital position measuring system according to claim 16 wherein said frequency $fx$4MHz, wherein said spacing X=360$L$x2,000, and wherein a unit count of said control counter represents a spacing X/B=0.18$L$.

18. A digital position measuring system as defined in claim 16 wherein said frequency $fx$4MHz, wherein said spacing X=0.2 inches, wherein B=2,000, and wherein a unit count of said control counter represents a spacing X/B=0.0001 inch.

19. A digital position measuring system according to claim 11 wherein said reference counter cycles at a constant rate, and wherein said control counter cycles at a rate determined by the frequency of a voltage-controlled oscillator, the frequency of said oscillator being controlled by the magnitude of said error signal.

20. In a function generator of the type utilizing "positive" pulses generated by coincidence between the contents of a counter advancing at a constant rate and a number contained in a control counter, and "negative" pulses generated by coincidence between said contents and the nine's complement of said number, said "positive" and "negative" pulses being combined to generate a first function, said "positive" and "negative" pulses being delayed in first and second delay counters, respectively, and then combined to produce another function, that improvement comprising means for recognizing "positive" coincidences between selected digits of said contents and corresponding digits of said number, and for recognizing "negative" coincidences between said like selected digits of said contents and corresponding digits of the nine's complement of said number, and means for advancing said first and second delay counters, respectively, in response to said recognized "positive" and "negative" coincidences.

21. A function generator according to claim 20 wherein said counters comprise decade counters, and wherein said selected digits are the ten's and units digits.

22. A system for measuring the position of a first member movable relative to a second member, and employing a position measuring device having cyclically spaced zero positions, said system comprising:
an internal counter controlled by said position measuring device, the contents of said counter indicating the relative position of said member between two adjacent-spaced zero positions,
means for storing a part-start position representing the distance of said first member from a reference not necessarily corresponding with one of said spaced zero positions,
an external counter having a greater number of digits than said internal counter,
a display slaved to said external counter, and
external control logic for presetting said external counter to said part-start position during a setup mode and for slaving said preset external counter to said internal counter during a readout mode, whereby during said readout mode said external counter and said display operate starting from said preset part-start position as said internal counter operates starting from said relative position.

23. A system for measuring the position of a first member movable relative to a second member, and employing a position measuring device having cyclically spaced zero positions, said system comprising:

an internal counter controlled by said position-measuring device, the contents of said counter indicating the relative position of said member between two adjacent-spaced zero positions,
means for storing a part-start position representing the distance of said first member from a reference not necessarily corresponding with one of said spaced zero positions,
an external counter having a greater number of digits than said internal counter,
external control logic for presetting said external counter to said part-start position during a setup mode and for slaving said preset external counter to said internal counter during a readout mode, whereby during said readout mode said external counter operates starting from said preset part-start position as said internal counter operates starting from said relative position,
said external control logic comprising:
a mode selection switch,
offset switch means for storing a representation of the offset of said fixed reference from one of said spaced zero positions,
a step counter reset when said mode selection switch is placed in a "setup" position,
first gating means, responsive to the reset state of said step counter, for causing said internal and external counters both to count to said stored part-start position, and for advancing said step counter to a second state,
second gating means, responsive to the second state of said step counter, for clearing to zero said external counter only, and for advancing said step counter to a third state,
third gating means, responsive to the third state of said step counter, for causing said internal and external counters to operate in unison until the contents of said internal counter represent said relative position, the contents of said external counter then representing said offset, said offset being storable in said offset switch means, and for setting said internal and external counters to zero and for advancing said step counter to a fourth state,
fourth gating means, responsive to the fourth state of said step counter, for causing said internal and external counters to count in unison until the contents of said external counter corresponds to said stored offset, and subsequently for clearing to zero said external counter only, and for advancing said step counter to a fifth state,
fifth gating means, responsive to the fifth state of said step counter, for causing said internal and external counters to count in unison until the contents of said internal counter corresponds to said relative position, the contents of said external counter then corresponding to said part-start position, thereby completing system setup.

24. A digital readout for a position measuring system of the type comprising a measuring device having a first part attached to a stationary member of a machine and a second part attached to a machine member relatively movable with respect to said stationary member, said measuring device having a plurality of equally spaced cycles separated by equally spaced sine zeros, an internal counter having a limited number of digits, and means cooperating with said measuring device for operating said internal counter so that the contents of said internal counter indicate the relative position of said movable member within one of said equally spaced cycles, an external counter having a greater number of digits, said external counter being slaved to said internal counter during normal readout operation, and a display slaved to said external counter, the improvement comprising means for storing a part-start position of said movable member relative to a reference zero not necessarily coincident with one of said sine zeros, and setup means for presetting said external counter and said display to represent said part-start position, whereby subsequent movement of said relatively movable member to a new position will cause said counter and said display to represent the new position relative to said reference zero.

25. A digital readout according to claim 24 wherein said counters operate at a faster rate during presetting than during normal readout.

26. Apparatus for eliminating jitter in the digital readout of a servo system of the type wherein an error signal is either plus or minus, said error signal changing sign as it passes through zero, pulses derived from said error signal operating said digital readout, said apparatus comprising means for inhibiting derivation of the next pulse following change of sign of said error signal and means responsive to said change of sign for causing said error signal again to change sign.

27. A digital position measuring system for the relatively movable members of a machine wherein the movable machine member is suitably driven, a position-measuring device having a stationary element for attachment to the stationary machine member and having a movable element for attachment to the movable machine member, said position-measuring device supplying an error signal depending on a comparison of the relative displacement of said elements with an input of trigonometrically related signals to said position-measuring device, means for generating said trigonometrically related signals in response to said error signal, means whereby said error signal changes the values of said trigonometrically related signals in a direction reducing said error signal to a small value, the improvement wherein a generator supplies different values of frequency, a control being provided for cooperation with said generator for converting said error signal to digital pulses having a frequency depending on the magnitude of said error signal.

28. A digital readout device for a position-measuring apparatus of the type comprising a position-measuring device having a first element adapted to be attached to a first member of a machine and a second element adapted to be attached to a second member of the machine wherein one of said members is relatively movable with respect to the other of said members, said second element having a plurality of equally spaced cycles at equally spaced positions and said first element having a coordinate with respect to said cycles, an internal counter having digital contents representing a coordinate between adjacent ones of said equally spaced positions, an external counter, a display slaved to said external counter for indicating the magnitude of the count in said external counter, a converter for converting said digital contents of said internal counter to analog signals and for applying said analog signals to said position-measuring device to produce an error signal as a function of the relative position of said first and second elements and of said analog signals, a control for converting said error signal to digital pulses, a first storage device for storing a part-start number, control apparatus causing said internal counter to be set with part-start number digits representing a part-start position within one of said cycles and said external counter to be cleared to zero, the digital contents of said internal counter causing said error signal to supply digital pulses to said internal and external counters to cause each to change in count by an amount Δ equal to the difference between the part-start number digits and the coordinate of said first element, said control apparatus including a program device movable through a plurality of states, a first gating means responsive to a first one of said states to clear both said internal counter and said external counter to zero, a second gating means responsive to a second one of said states to cause said external counter to count up to the setting of said first storage device from said cleared condition, said internal counter counting in unison with said external counter from said cleared condition, whereby said internal counter contains a count corresponding to said part-start number digits, a third gating means responsive to a third one of said states to clear said external counter only, and a fourth gating means responsive to a fourth one of said states to cause said external counter to count in unison with said internal counter under control of said control responsive to the error signal whereby said internal counter counts to the coordinate of said first element and the contents of said external counter and said display means represent the amount Δ.

29. Device according to claim 28 wherein the contents of said external counter and said display means represent the complement of Δ.

30. In a digital readout apparatus for a position-measuring device having a first member movable with respect to a second fixed member along a path having plurality of equally spaced measuring cycles, said fixed member having a part zero position normally offset by a first amount from a zero reference position in one of said cycles, said movable member having a part-start position normally offset by a second amount from a said zero reference position in one of said cycles, an internal counter having a capacity only to count an amount representing the full distance within a said cycle, an external counter having a capacity greater than said internal counter and sufficient to count an amount representing the distance between said part zero position and said part-start position, display means slaved to said external counter, and control means cooperable with said measuring device for causing said internal counter to count to said second amount, the combination comprising, selectively settable switch means for storing an amount indicative of the distance between said part-start position and said part zero position, a program device movable through a plurality of states, a first gating means responsive to a first one of said states to cause said external counter to count up to the setting of said switch means from a cleared condition and to cause said internal counter to count in unison with said external counter from a cleared condition, said internal counter being effective to restart counting when its capacity is reached, a second gating means responsive to a second one of said states to clear said external counter only, and a third gating means responsive to a third one of said states to cause said external counter to count in unison with said internal counter and to cause said control means to control said internal counter whereby said internal counter will count to said second amount and said external counter and said display means will represent said first amount.